(12) United States Patent
Shimano et al.

(10) Patent No.: US 11,209,643 B2
(45) Date of Patent: *Dec. 28, 2021

(54) PHASE FILTER, IMAGING OPTICAL SYSTEM, AND IMAGING SYSTEM

(71) Applicant: MAXELL, LTD., Kyoto (JP)

(72) Inventors: Takeshi Shimano, Tokyo (JP); Kouichi Sakita, Tokyo (JP); Mitsuhiko Oota, Tokyo (JP)

(73) Assignee: MAXELL, LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/590,733

(22) Filed: Oct. 2, 2019

(65) Prior Publication Data
US 2020/0036876 A1 Jan. 30, 2020

Related U.S. Application Data

(63) Continuation of application No. 15/962,907, filed on Apr. 25, 2018, now Pat. No. 10,477,086, which is a (Continued)

(30) Foreign Application Priority Data

Mar. 29, 2013 (JP) .................................. 2013-072388

(51) Int. Cl.
*G02B 27/00* (2006.01)
*G02B 3/08* (2006.01)
(Continued)

(52) U.S. Cl.
CPC ....... *G02B 27/0075* (2013.01); *G02B 3/0043* (2013.01); *G02B 3/08* (2013.01);
(Continued)

(58) Field of Classification Search
None
See application file for complete search history.

(56) References Cited

U.S. PATENT DOCUMENTS 3,669,527 A 6/1972 Fuller
4,545,653 A * 10/1985 Brenden ................ G11B 7/085
359/719
(Continued)

FOREIGN PATENT DOCUMENTS

CN 1963587 A 5/2007
JP 3-107799 U 11/1991
(Continued)

OTHER PUBLICATIONS

Office Action dated Aug. 23, 2016 for related Japanese Patent Application No. 2013-072388.
(Continued)

*Primary Examiner* — Quan Pham
(74) *Attorney, Agent, or Firm* — Miles & Stockbridge, P.C.

(57) ABSTRACT

A phase filter 101 is configured to comprise an annular structure rotationally symmetrical about an optical axis, each annular zone including a cross-sectional shape of substantially parabola for uniformly extending incident rays of light on a focal plane and letting the rays overlap with each other.

13 Claims, 29 Drawing Sheets

Related U.S. Application Data continuation of application No. 14/780,972, filed as application No. PCT/JP2013/078090 on Oct. 16, 2013, now Pat. No. 9,967,441.

(51) Int. Cl.

| | | |
|---|---|---|
| *H04N 5/232* | (2006.01) | |
| *G02B 3/00* | (2006.01) | |
| *G02B 27/46* | (2006.01) | |
| *G02B 27/12* | (2006.01) | |
| *H04N 5/222* | (2006.01) | |
| *G06K 9/00* | (2006.01) | |
| *G08G 1/16* | (2006.01) | |

(52) U.S. Cl.
CPC ........... *G02B 27/123* (2013.01); *G02B 27/46* (2013.01); *G06K 9/00805* (2013.01); *H04N 5/2226* (2013.01); *H04N 5/23229* (2013.01); *G02B 3/0056* (2013.01); *G08G 1/166* (2013.01)

(56) References Cited

U.S. PATENT DOCUMENTS

| | | | |
|---|---|---|---|
| 5,260,727 | A | 11/1993 | Oksman et al. |
| 5,748,371 | A | 5/1998 | Cathey, Jr. et al. |
| 5,760,871 | A | 6/1998 | Kosoburd et al. |
| 5,814,803 | A | 9/1998 | Olmstead et al. |
| 5,963,359 | A | 10/1999 | Shinozaki et al. |
| 6,157,500 | A | 12/2000 | Yamazaki et al. |
| 6,317,261 | B1 | 11/2001 | Otaki |
| 6,480,344 | B1 | 11/2002 | Maruyama |
| 2003/0142877 | A1 | 7/2003 | George et al. |
| 2003/0234867 | A1 | 12/2003 | Fujita et al. |
| 2004/0228005 | A1 | 11/2004 | Dowski, Jr. |
| 2004/0230299 | A1 | 11/2004 | Simpson et al. |
| 2004/0257543 | A1 | 12/2004 | Dowski, Jr. et al. |
| 2005/0046818 | A1* | 3/2005 | Neil .............. G02B 21/06 355/55 |
| 2005/0259266 | A1 | 11/2005 | Seko |
| 2006/0082882 | A1 | 4/2006 | Wang et al. |
| 2006/0203360 | A1* | 9/2006 | Aruga .............. G02B 9/16 359/793 |
| 2007/0017993 | A1 | 1/2007 | Sander |
| 2007/0097253 | A1 | 5/2007 | Woo et al. |
| 2007/0279618 | A1 | 12/2007 | Sano et al. |
| 2007/0291278 | A1 | 12/2007 | Seko |
| 2009/0279189 | A1 | 11/2009 | Getman et al. |
| 2010/0097487 | A1 | 4/2010 | Marom et al. |
| 2010/0116336 | A1 | 5/2010 | Martinez Anton et al. |
| 2010/0277594 | A1* | 11/2010 | Augey .............. G02B 27/0012 348/164 |
| 2011/0054348 | A1 | 3/2011 | Hendriks et al. |
| 2011/0082541 | A1 | 4/2011 | Zalevsky |
| 2011/0085050 | A1 | 4/2011 | Dowski, Jr. et al. |
| 2012/0193430 | A1 | 8/2012 | Meier et al. |
| 2012/0215299 | A1 | 8/2012 | Melzer et al. |
| 2012/0307135 | A1 | 12/2012 | Iba et al. |
| 2014/0016837 | A1 | 1/2014 | Nechyba et al. |
| 2014/0168498 | A1 | 6/2014 | Ono |
| 2014/0204118 | A1 | 7/2014 | Berry et al. |
| 2014/0219504 | A1 | 8/2014 | Haraguchi et al. |

FOREIGN PATENT DOCUMENTS

| | | | | |
|---|---|---|---|---|
| JP | | 7-198909 A | 8/1995 | |
| JP | | 8-271942 A | 10/1996 | |
| JP | | 3275010 B2 | 2/2002 | |
| JP | | 2002-244050 A | 8/2002 | |
| JP | | 2005-331784 A | 12/2005 | |
| JP | | 2007327966 A | 12/2007 | |
| JP | | 2011-120309 A | 6/2011 | |
| JP | | 2011-128238 A | 6/2011 | |
| WO | | 9624085 A1 | 8/1996 | |
| WO | | 2006137355 A1 | 12/2006 | |
| WO | | WO-2006137355 A1 * | 12/2006 | ............... G02B 3/08 |

OTHER PUBLICATIONS

Office Action dated Nov. 10, 2016 for related Chinese Application No. 2013800751907.

Office Action dated Sep. 5, 2017 for related Chinese Patent Application No. 201380075190.7.

* cited by examiner

PHASE FILTER, IMAGING OPTICAL SYSTEM, AND IMAGING SYSTEM

TECHNICAL FIELD

The present invention relates to a phase filter, an imaging optical system and an imaging system, more particularly to technique for enabling suppression of an in-plane position shift of an image point in response to defocus in a focal depth extended image subject to image processing by WFC.

BACKGROUND ART

The present application claims Convention priority from Japanese Patent Application No. 2013-72388 filed on Mar. 29, 2013, the full content of which incorporated herein by reference.

In a pupil plane of an optical system of an imaging camera, the technique called "Wavefront Coding," hereinafter referred to as "WFC," for extending a depth of field and/or a focal depth of an optical system. The WFC uniforms blur of a point for defocus by providing a phase distribution given by a cubic function to a coordinate on the pupil plane and removing the uniformed blur by an image processing called deconvolution.

As the related art regarding the WFC, the technique is proposed such that a focal depth of an optical system is extended by processing a captured image with phase modulation of a pupil function with a phase filter realized by implementing a cubic phase function in an optical system of an imaging camera, for example. See PTL1. Further, the technique for extending a focal depth such that, when employing a x-y coordinate orthogonal to an optical axis as a phase filter for modulating an optical transfer function, hereinafter "OTF", a captured image is processed by providing a phase distribution obtained by normalizing a cubic function with a series of the function represented by a product of arbitrary power of the same. See PTL2. Furthermore, although not for an imaging optical system, the technique for attempting improvement in efficiency in wave length conversion for laser by generating a non-diffraction beam using a conical prism called "axicon" is also proposed. See PTL3.

CITATION LIST

Patent Literature

[PTL1] Japanese Patent No. 3275010
[PTL2] Japanese Patent Laid-open Publication No. 2011-120309
[PTL3] Japanese Patent Laid-open Publication No. H08-271942

SUMMARY OF INVENTION

Technical Problem

In the background art above, the phase distribution of a phase filter is given to the x-axis and the y-axis of the coordinate on the pupil plane with a cubic function or a similar function. When attempt is made to uniform a point image for defocus using a phase filter that is not rotationally symmetric about an optical axis as above, there is a problem that the position of a point image is shifted in response to the amount of defocus.

For example, the phase distribution is expressed with coefficient α by the formula below for a normalized pupil plane coordinate x, y:

$$W(x,y) = \alpha \cdot (x^3 + y^3) \qquad \text{Formula 1}$$

When a wavefront aberration of defocus is added thereto, the phase distribution is expressed using a normalized pupil radius ρ by the formula below:

$$W(x,y) + W_{20}\rho^2 = \alpha \cdot (x^3 + y^3) + W_{20}(x^2 + y^2) = \qquad \text{Formula 2}$$

$$\alpha \left\{ \left(x + \frac{W_{20}}{3\alpha}\right)^3 + \left(y + \frac{W_{20}}{3\alpha}\right)^3 \right\} - \frac{W_{20}^2}{3\alpha}(x+y) - \frac{2W_{20}^3}{27\alpha^2}$$

Here, $W_{20}$ is a defocus, i.e., an aberration coefficient of defocus. The first item means that the phase distribution of a cubic function is added in both x- and y-directions with shift of $W_{20}/3\alpha$ respectively in a pupil plane. Since the above shift basically corresponds to a phase shift on a focus plane, the shift does not affect a point image intensity distribution. The second item represents a phase distribution of a linear function of x, y, corresponds to a so called a wavefront tilt, and means that an image point position on a focal plane shifts in proportion to $W_{20}^2/3\alpha$. The third item is a constant item that does not affect a point image intensity distribution. Therefore, when a cubic phase distribution exists, a wavefront aberration of defocus is naturally converted into lateral deviation. If only this lateral deviation is allowed, even if defocus exists, a point image distribution does not substantially change, thus a manner of blur is uniform without relation to defocus. The above enables deconvolution and this is a principle of WFC. However, on the other hand, the above causes shift of a point image due to defocus. Therefore, there may arise a problem in such an application that a position of an object is measured with a position of a point image.

Further, an optical plane such as cubic distribution that causes phase distribution that is not rotationally symmetrical about an optical axis basically requires a similar aspherical optical plane. As to an aspherical surface, a metal mold formed with working by a turning lathe having a cutting tool has enabled wide spread of plastic injection molding, molding with a glass mold, and the like. However, an object of turning lathe working must have a symmetrical shape about a rotational axis. An asymmetrical shape about an axis such as a cubic aspherical surface requires a two-dimensional numerical controlled working by a rotary grinding tool which will lead to increase in a working cost and/or a working time.

Further, the phase filter described with a continuous function such as a cubic distribution requires at least tens of wave lengths each consisting of upward and downward convexities. In this case, there arises a problem such that, when a ray of light with an image angle enters the phase filter, a phase shift amount deviates from a preferable shift amount.

Furthermore, in an optical system using axicon, within a range in which parallel beams entering a bottom surface of the axicon are refracted to overlap, laser beams travels without refraction as a thin beam as a collection of the laser beams. However, this lens is used for parallel beams, and cannot be applied to such an optical system that many imaging points are simultaneously required such as an imaging camera.

In view of the above, one object of the present invention is to provide technique for enabling suppression of an in-plane position shift of an image point in response to defocus in a focal depth extended image subject to image processing by WFC.

Solution to Problem

In order to solve the above problems, a phase filter according to the present invention comprises an annular structure rotationally symmetrical about an optical axis, each annular zone including a cross-sectional shape of substantially parabola for uniformly extending incident rays of light on a focal plane and letting the rays overlap with each other. According to this configuration, an in-plane position shift of an image point in response to defocus in a focal depth extended image subject to image processing by WFC can be suppressed.

Further, an imaging optical system according to the present invention comprises a phase filter including an annular structure rotationally symmetrical about an optical axis, each annular zone including a cross-sectional shape of substantially parabola for uniformly extending incident rays of light on a focal plane and letting the rays overlap with each other. According to this configuration, an in-plane position shift of an image point in response to defocusing in a focal depth extended image subject to image processing by WFC can be suppressed. Meanwhile, application of the imaging optical system to measurement of a position of an object in accordance with a position of a point image is enabled.

Further, an imaging system according to the present invention applies a deconvolution image processing to an image captured by an imaging optical system equipped with an image forming system having a phase filter according to the present invention comprising an annular structure rotationally symmetrical about an optical axis, each annular zone including a cross-sectional shape of substantially parabola for uniformly extending incident rays of light on a focal plane and letting the rays overlap with each other, and obtains a focal depth extended image. According to this configuration, an in-plane position shift of an image point in response to defocus in a focal depth extended image subject to image processing by WFC can be suppressed. Meanwhile, application of the imaging optical system to measurement of a position of an object in accordance with a position of a point image is enabled.

Further, a vehicle driving support apparatus according to the present invention applies a deconvolution image processing to images of objects around the vehicle captured by an imaging optical system equipped with an image forming system having a phase filter according to the present invention comprising an annular structure rotationally symmetrical about an optical axis, each annular zone including a cross-sectional shape of substantially parabola for uniformly extending incident rays of light on a focal plane and letting the rays overlap with each other, obtains focal depth extended images, applies a predetermined image recognition algorithm to the focal depth extended images, and simultaneously detects a plurality of objects within a constant distance range from the vehicle at mutually different positions. According to this configuration, simultaneous detection of obstacles existing at close and distant positions from the vehicle, and an effect of improving safety for driving vehicles can be accomplished.

Further, a monitoring apparatus according to the present invention applies a deconvolution image processing to images in a monitoring target area captured by an imaging optical system equipped with an image forming system having a phase filter comprising an annular structure rotationally symmetrical about an optical axis, each annular zone including a cross-sectional shape of substantially parabola for uniformly extending incident rays of light on a focal plane and letting the rays overlap with each other, obtains focal depth extended images, applies a predetermined image recognition algorithm to the focal depth extended images, and simultaneously detects a plurality of persons at mutually different positions from the imaging optical system within the monitoring target area. According to this configuration, improvement of a recognition rate for suspicious persons and/or criminals and the like intruded into or existing in the monitoring target area without regard to a distance from the imaging optical system can be accomplished.

Further, an authentication apparatus according to the present invention applies a deconvolution image processing to each image of an identical authentication target in images captured multiple times by an imaging optical system equipped with an image forming system having a phase filter comprising an annular structure rotationally symmetrical about an optical axis, each annular zone including a cross-sectional shape of substantially parabola for uniformly extending incident rays of light on a focal plane and letting the rays overlap with each other, obtains focal depth extended images, applies a predetermined image recognition algorithm to the focal depth extended images, and authenticates the identical authentication target from each of the images with different distances from the imaging optical system. According to this configuration, even in such a situation that a distance between the authentication objects such as a human fingerprint, vein, iris or the like and the imaging optical system changes for each authentication operation, such variation in the distance can be properly absorbed and improvement of authentication accuracy is enabled.

Further, a medical apparatus according to the present invention applies a deconvolution image processing to images in a medical care target area of a human in images captured by an imaging optical system equipped with an image forming system having a phase filter comprising an annular structure rotationally symmetrical about an optical axis, each annular zone including a cross-sectional shape of substantially parabola for uniformly extending incident rays of light on a focal plane and letting the rays overlap with each other, obtains focal depth extended images, applies a predetermined image recognition algorithm to the focal depth extended images, and simultaneously outputs images of multiple locations in the medical care target area with different distances from the imaging optical system. According to this configuration, simultaneous visibility by medical staff for affected areas without regard to a distance between each of the affected areas and the imaging optical system can be improved. This leads to simplification of optical system design in medical cameras and the like, reduction of the number of lenses required, etc. and to reduction in a manufacturing cost.

It is to be noted that in any of the above vehicle driving support apparatus, the monitoring apparatus, the authentication apparatus and the medical apparatus, adjustment accuracy between a lens and a sensor surface can be tolerated and thereby reduction of manufacturing cost can be accomplished.

Advantageous Effects of Invention

According to the present invention, an in-plane position shift of an image point in response to defocus can be suppressed in a focal depth extended image subject to image processing by WFC.

DESCRIPTION OF EMBODIMENTS

Figure 1:
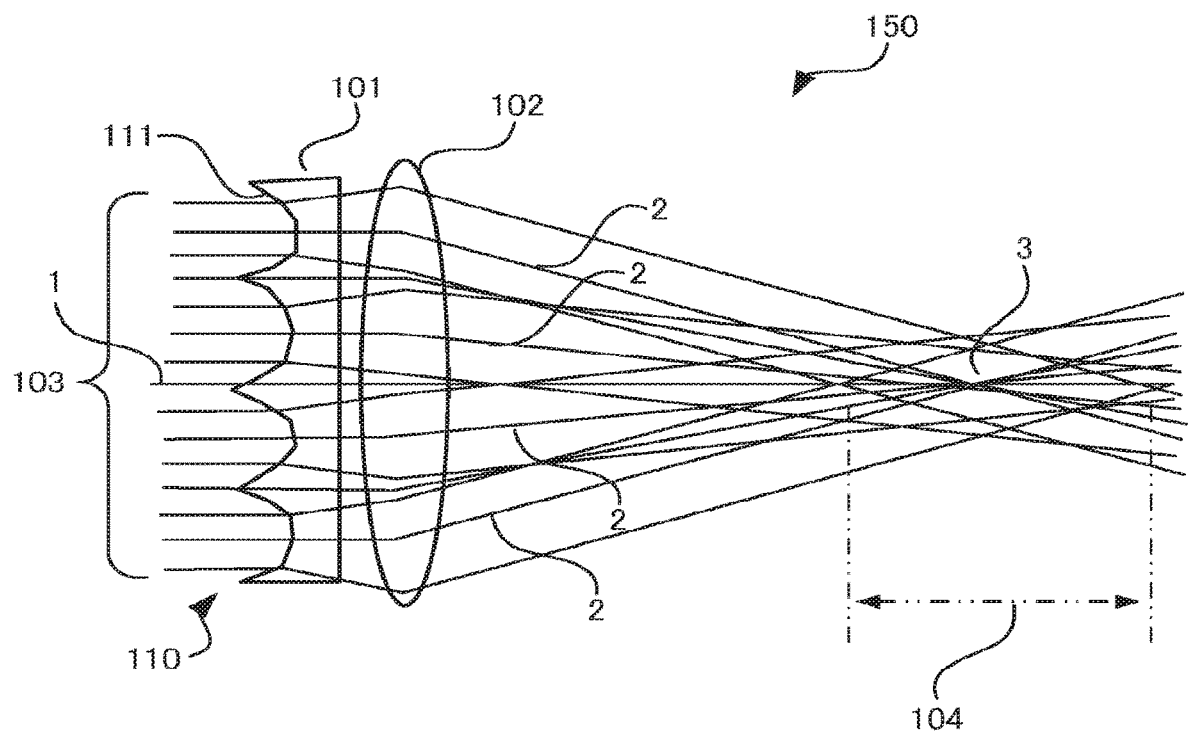
FIG. 1 is a schematic figure of an imaging optical system equipped with a phase filter of the first mode of the present invention.
Figure 2:
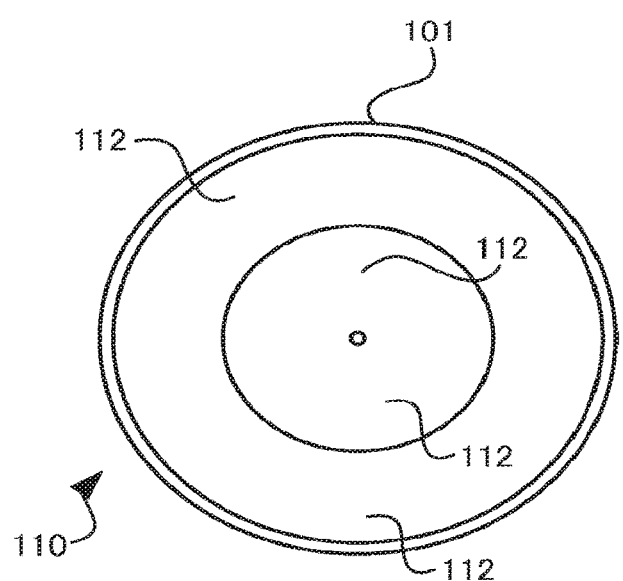
FIG. 2 is a plan view showing a structure of the phase filter of the first mode of the present invention.
Figure 3:
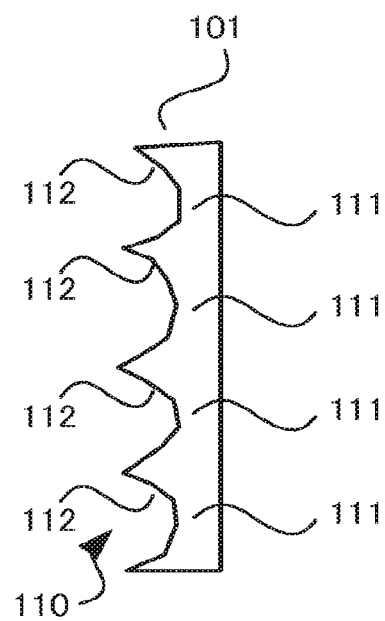
FIG. 3 is a side cross-sectional view showing a structure of the phase filter of the first mode of the present invention.

Modes of the present invention will be described in detail referring to the drawings hereinbelow. FIG. 1 is a schematic diagram of a phase filter 101 of the first mode of the present invention and an imaging optical system 150 equipped with the filter 101. FIG. 2 is a plan view showing a structure of the phase filter 101 of the first mode. FIG. 3 is a side cross-sectional view showing the structure of the filter 101. It is to be noted that the phase filter 101 and an image forming lens 102 included in the imaging optical system 150 in FIG. 1 are illustrated as a shape of a side cross-section thereof.

As shown FIGS. 1-3, the phase filter 101 is disc-shaped and has a shape rotationally symmetrical about an optical axis 1. The phase filter 101 is provided with concave surfaces 112 as grooves each having a palabra cross-section concentrically around a center of the optical axis 1 in substantially equal intervals. The concave surface 112 formed concentrically around the optical axis 1 is called an annular zone 111 and a group of the annular zones 111 are called an annular structure 110 herein. The example of the phase filter 101 shown in FIGS. 1-3 has the annular structure 110 including two lines of the annular zones 111. The annular zone 111 constitutes a concave surface acting as a concave lens in a radial direction of a pupil plane for a ray of light entering the annular zone 111. It is to be noted that a width of the annular zone 111 of the phase filter 101 shown here are equal to each other among the annular zones 111.

In the imaging optical system 150, an image forming lens 102 is arranged to share the optical axis 1 with the above phase filter 101. The image forming lens 102 is the lens that is able to form an image of an object space at a predetermined position on the optical axis 1 when the phase filter 101 is not provided. With the imaging optical system 150 constituted as a configuration of combination of the above image forming lens 102 with the phase filter 101, rays of light 103 as an incident light flux entering the phase filter 101 are refracted by the above concave surfaces 112 to be a diverging light locally. A curvature of the concave surface 112 of the phase filter 101 is defined so that the diverging light is converted into substantially parallel light flux locally, on the paper sheet, by the image forming lens 102. Being "substantially parallel locally" means a state where a group of rays of light passed through each of the concave surface 112 are substantially parallel to each other after passing through the image forming lens 102.

The locally substantially parallel light flux propagates toward an original focus position 3 along a refracting direction of the rays of light 2 passing the center of the annular zone 111. The reason for the propagation direction is as follows. Namely, an imaginary tangential plane for the concave surface 112 as a parabola cross-section at the center of the annular zone 111 is orthogonal to the optical axis 1 of the image forming lens 102 and the ray of light passing the center enters the image forming lens 102 without refraction at the phase filter 101. Resultantly it is obvious that the ray of light passes the focus position 3 for absence of the phase filter 101. As described above, the substantially parallel rays of light from the annular zones 111 are overlapped in a range 104 adjacent to the focus position 3 in the optical axis direction. For convenience of explanation, the rays of light from each of the annular zones 111 diverging then refracted by the image forming lens 102 are called a substantially parallel light flux. However, since the phase filter 101 and the image forming lens 102 are rotationally symmetrical about the optical axis 1, the substantially parallel light flux is actually the light flux propagating like traveling along a side surface of a cone.

Figure 4:
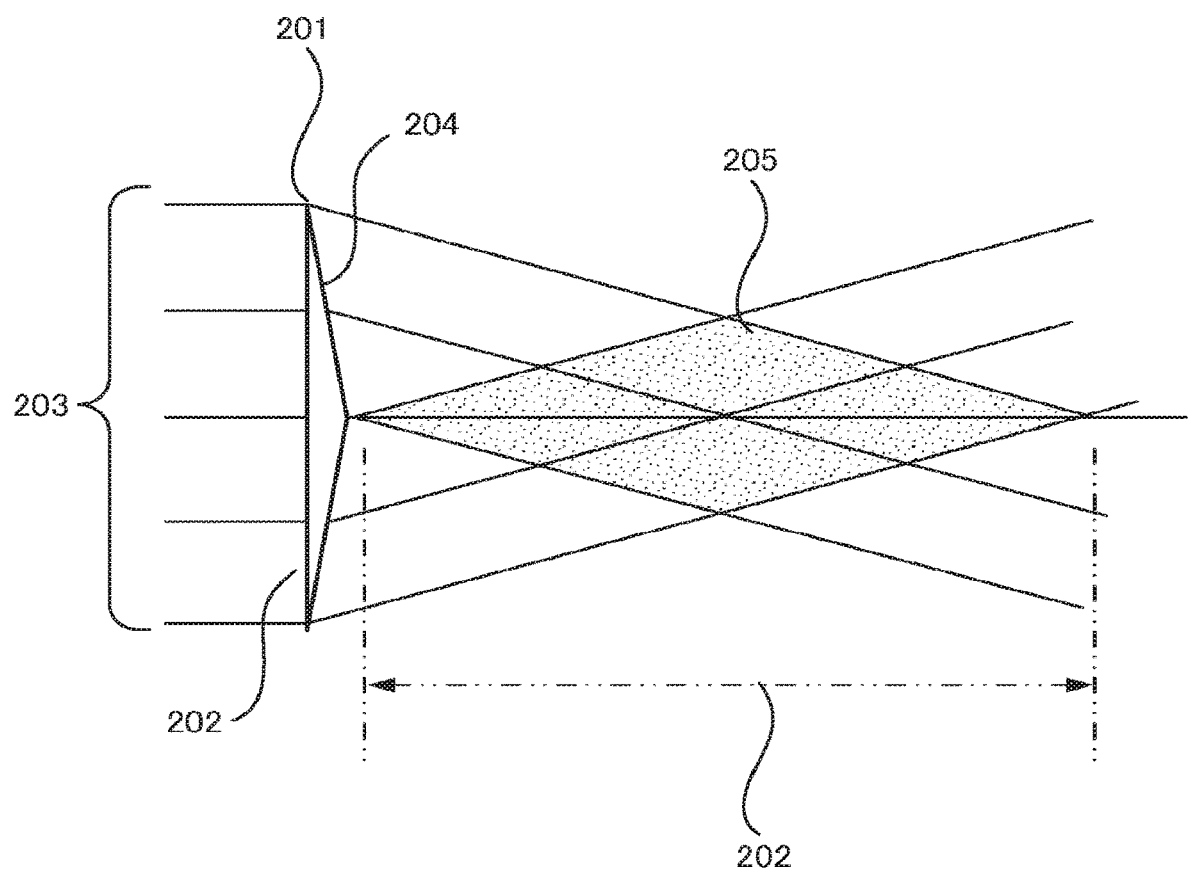
FIG. 4 is diagram showing a refracted rays of light according to an axicon prism.

The above light flux is similar to the rays of light refracted by an axicon 201 shown in FIG. 4. The axicon 201 is a conical lens having a flat bottom surface as a first surface and a cone as a second surface. The axicon 201 is also called an axicon prism. FIG. 4 schematically shows the relationship among the side cross-section of the above axicon 201, the optical axis 1, and the incident parallel light flux 203. The parallel light flux 203 entering at the bottom surface 202 of the axicon 201 is refracted by a slanted side surface 204 of the axicon 201 and are uniformly converged in a light path along the imaginary conical surface. In an area 202 where the light fluxes 203 entering with an angle from both sides overlap to make a diamond shape in the figure, an area 205 having a shape such that two cones are fastened at their bottom surfaces as opposing to each other is formed. The area 205 is shown in FIG. 4 as highlighted to clearly indicate the area 205. In Within the range 202 along the optical axis direction in the area 205, non-diffracting beam is formed. As to the light fluxes from each of the annular zones 111 of the phase filter 101 in FIG. 1 above, corresponding to overlapping of a plurality of light fluxes from the axicon 201 in different angles illustrated in FIG. 4, a plurality of non-diffracting beams are superposed to each other and smoothing of the point image distribution in a focus point direction is accomplished.

Figure 5:
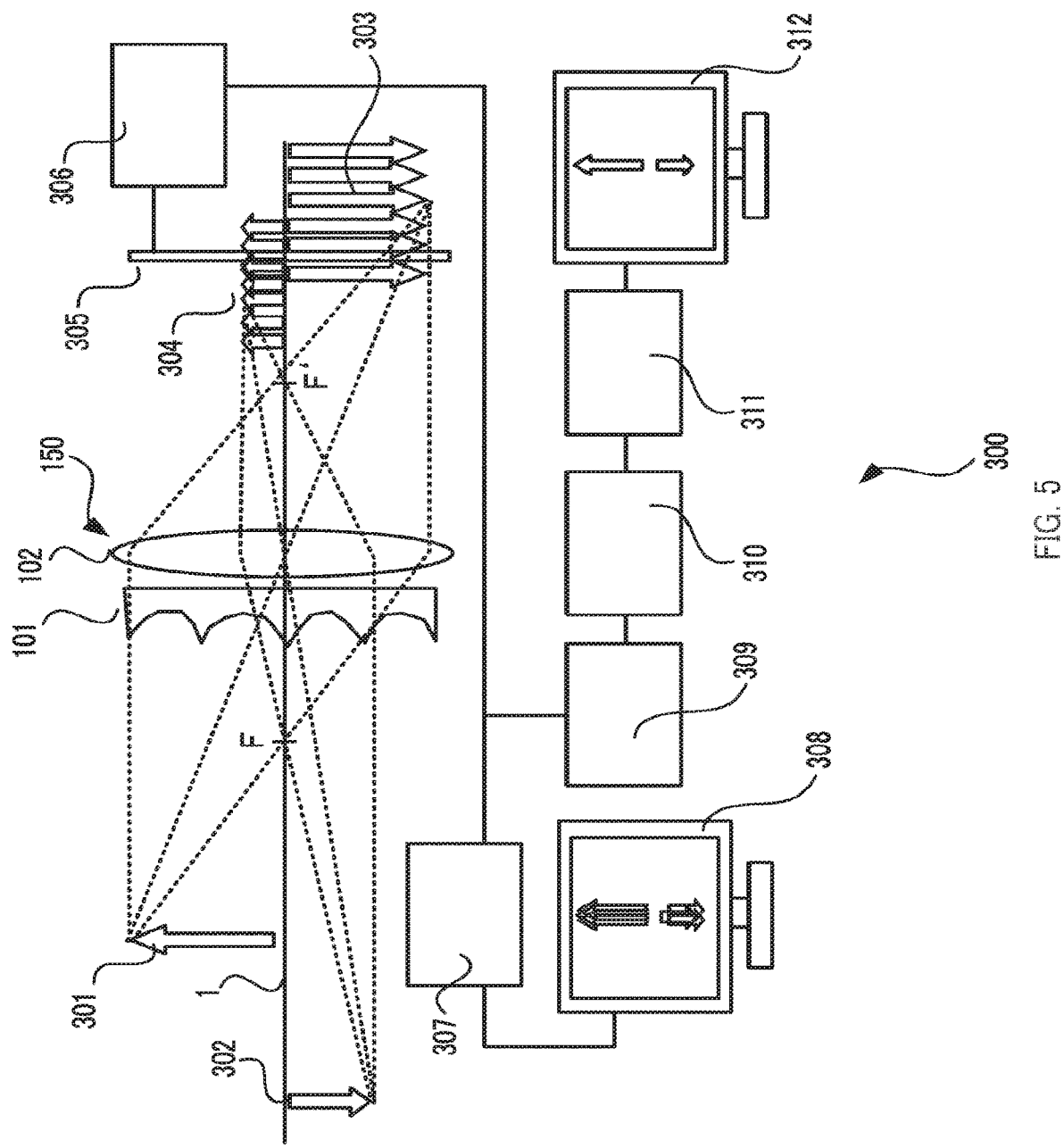
FIG. 5 is a diagram showing an exemplary configuration of an imaging optical system equipped with the phase filter of the first mode of the present invention and an imaging system for applying image processing to an image captured by the imaging optical system.

Then, the configuration of the imaging optical system 150 using the phase filter 101 and an imaging system 300 for applying image processing for images captured by the imaging optical system 150 will be described referring to FIG. 5. Here, such an assumption is made that an object 301 exists at a position relatively close from the imaging optical system 150 and an object 302 exists at a position distant from the imaging optical system 150.

In this case, the reflected lights from the objects 301, 302 enter the image forming lens 102 through the phase filter 101 of the imaging optical system 150 to form images 303, 304 having uniform magnitude of blur in the optical axis 1 direction. The uniform blur is caused by smoothing of the point image distribution in the focus point direction as described above. In view of the above, the imaging system 300 has a configuration in which an image sensor 305 is arranged at a position where the images 303, 304 overlap to each other in an optical axis direction.

The imaging system 300 also has an image signal output circuit 306 for converting an output signal from the above image sensor 305 into an image signal in an appropriate still image or a moving image format while maintaining information of maximum resolution capable of outputting by the image sensor 305 and outputting the converted image signal. The imaging system 300 has a monitor output generating circuit 307 for receiving the image signal outputted from the image signal output circuit 306, converting the image signal into an image signal of a format capable of being outputted to a display, and outputting to a monitor display 308. As the images displayed on the monitor display 308, as schematically shown in FIG. 5, uniformly blurred images 303, 304 are obtained for the close object 301 and the distant object 302. It is to be noted that, since the above monitor output processing is not mandatory as the imaging system 300, the configuration without the monitor display 308 and the monitor output generating circuit 307 will be possible.

Further, the imaging system 300 has a deconvolution preprocessing circuit 309, and a deconvolution filter circuit 310. In the imaging system 300, the output signal from the image signal output circuit 306 is divided and inputted to the deconvolution preprocessing circuit 309. According to the above, in the deconvolution preprocessing circuit 309, the above output signal is converted into an image signal of a digital image data type suitable to filter operation at the deconvolution tilter circuit 310. The output signal from the deconvolution preprocessing circuit 309 is subject to filtering processing at the deconvolution filter circuit 310 and inputted to a second monitor output generating circuit 311. The second monitor output generating circuit 311 converts an input signal from the deconvolution filter circuit 310 into an image signal of an appropriate general still image or moving image format and outputs the converted image signal into a second monitor display 312 to be displayed thereon. In the case that output display is made on the second monitor display 312, as noted above, the image in which both the close object 301 and the distant object 302 are focused is outputted. In this case, since the phase filter 101 is used, in the output image on the second monitor display 312, the positions of the objects in the image may not be shifted dependent on the distances from the imaging optical system 150 and the images are generated at the positions reflecting the original positions.

Figure 6:
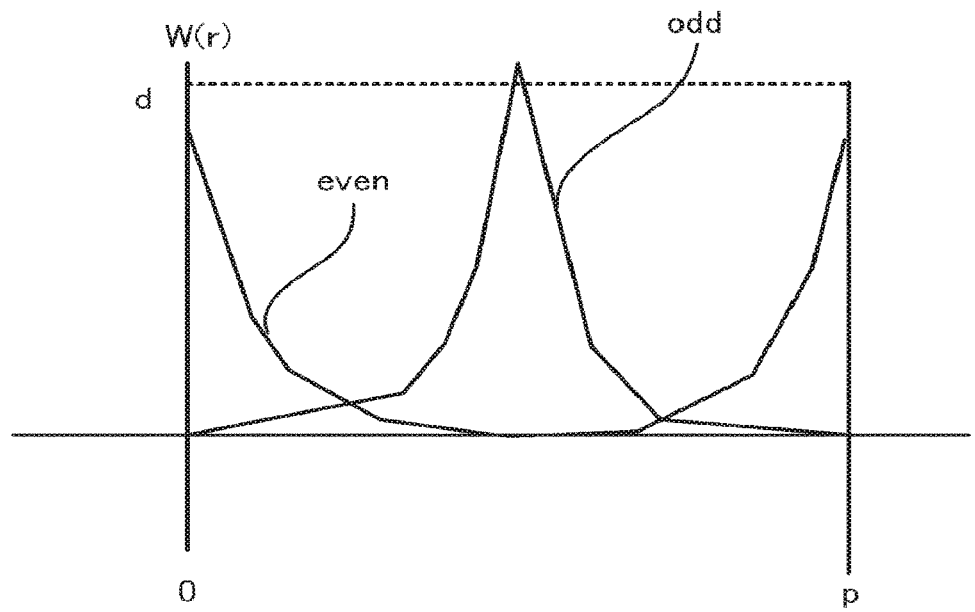
FIG. 6 is a schematic diagram for formulating the shape of a parabola cross-section.

Then, description will be made on a simulation for confirming an effect of focal depth extension when the above phase filter 101 is employed. FIG. 6 is a schematic diagram for formulating a shape of the parabola cross-section or the concave surface 112 of the phase filter 101. In the figure, a horizontal axis is a radial coordinate of a pupil plane and a vertical axis indicates the shape of the phase filter 101. Meanwhile, FIG. 6 shows the graph for one cycle, and the graph having a steep peak at an optical axis position of radius O is indicated as "even" and the graph having the bottom of the parabola is positioned on the optical axis is indicated as "odd". The depth of the parabola cross-section is represented with "d". The graph shape is repeated by a period p in a radial direction. The above graph shape is expanded with Fourier series as shown by Formula 3 and is finally expressed as Formula 4.

$$W(r) = \sum_{k=0}^{m} a_k \cos\left(\frac{2\pi k}{p}r\right) = \begin{cases} \frac{4d}{p^2}r^2 & \left(\text{odd}: -\frac{p}{2} < r < \frac{p}{2}\right) \\ \frac{4d}{p^2}\left(r - \frac{p}{2}\right)^2 & (\text{even}: 0 < r < p) \end{cases} \quad \text{Formula 3}$$

$$W(r) = \begin{cases} \frac{d}{3} + \frac{4d}{\pi^2}\sum_{k=1}^{m}\frac{(-1)^k}{k^2}\cos\left(\frac{2\pi k}{p}r\right) & (\text{odd}) \\ \frac{d}{3} + \frac{4d}{\pi^2}\sum_{k=1}^{m}\frac{1}{k^2}\cos\left(\frac{2\pi k}{p}r\right) & (\text{even}) \end{cases} \quad \text{Formula 4}$$

Here, the period p is expressed as Formula 5.

$$p = \begin{cases} \frac{2r_n}{2n-1} & (\text{odd}) \\ \frac{r_n}{n} & (\text{even}) \end{cases} \quad \text{Formula 5}$$

In formula 5, $r_n$ is a radius of the nth annular zone 111 corresponding to the pupil radius of the imaging optical system 150. The annular structure 110 presented here includes the annular zones 111 each having the same width and the same phase difference. It is to be noted that assumption is made such that the phase filter 101 is disposed at a pupil plane of the imaging optical system 150. This means that the phase filter 101 may be disposed at a position of a stop in the actual imaging optical system 150.

As described above, the cross-sectional shape of the annular zone 111 of the phase filter 101 is assumed to be a parabola cross-section. However, the cross-section needs not be limited to the cross-section is described by a quadric function for the local radial coordinate. For example, the cross-section may be circular or elliptic. In all examples a quadric expanded item for the radius adjacent to the apex of the cross-section of the annular zone 111 is dominant. Therefore, the parabola cross-section is assumed.

Figure 7:
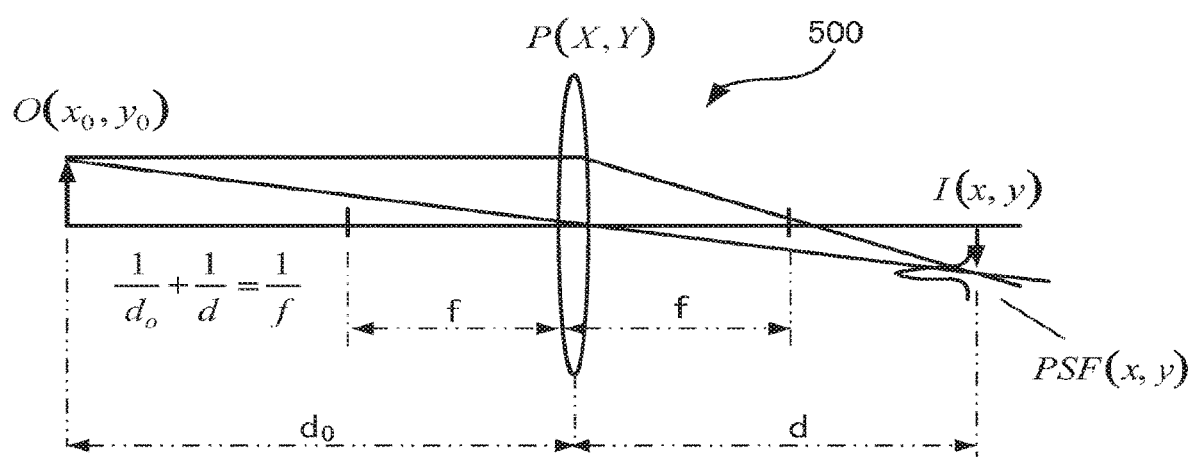
FIG. 7 is a schematic diagram of an image forming optical system for explaining a deconvolution operation.

Then, the deconvolution image processing will be described. Assumption is made such that, as shown in FIG. 7, an object expressed by a light intensity distribution O(xO, yO) exists at distance do and an optical image intensity distribution T(x, y) forms an image at a distance d according to the image forming formula below by means of an optical system 500 with a focal length f. Here, assuming the light intensity distribution of the object as a set of point light sources, superposition of wave-optical point image distributions PSF(x, y) of the point light sources forms the image I(x, y). The point image distribution is given by the formula below where an aperture of the stop of the image forming optical system 500 i.e., an amplitude transmittance of a pupil plane is expressed as P(X, Y):

$$PSF(x, y) = \frac{1}{(\lambda d)^2}|F[P(X, Y)]|^2 \quad \text{Formula 6}$$

F standing for two dimensional Fourier transformation is expressed by the formula below.

$$F[P(X, Y)] = \int_{-\infty}^{\infty}\int_{-\infty}^{\infty} P(X, Y)\exp\left\{-i\frac{2\pi}{\lambda d}(Xx + Yy)\right\}dXdY \quad \text{Formula 7}$$

As well-known generally, Fourier transformation is an operation for transforming time, space distribution and the like as a physical quantity into their frequency spectra. By integrating and superposing the point image distribution for geometric map O(x, y) of the light intensity distribution of the object surface, intensity distribution of an image plane is expressed with the formula below.

$$I(x, y) = O(x, y) * PSF(x, y) = \quad \text{Formula 8}$$
$$\int_{-\infty}^{\infty}\int_{-\infty}^{\infty} O(x', y')PSF(x-x', y-y')dx'dy'$$

Here, symbol * means an operation of convolution integration. Further, by applying Fourier transformation to the image plane intensity distribution, a space spectrum of the image plane light intensity distribution is proved to be a product of the space frequency spectrum of an object surface and the space frequency spectrum of the point image distribution as shown with the formula below.

$$F[I(x,y)] = F[O(x,y)*PSF(x,y)] \times F[O(x,y)]F[PSF(x,y)]$$
$$= F[O(x,y)]OTF \quad \text{Formula 9}$$

The space frequency spectrum of the point image distribution is called an optical transfer function OTF and expressed by an autocorrelation function of a pupil function as follows.

$$OTF = \quad \text{Formula 10}$$
$$F[PSF(x, y)] = F[|F[P(X, Y)]|^2] = P(X, Y) * P^*(X, Y) =$$
$$\int_{-\infty}^{\infty}\int_{-\infty}^{\infty} P(X', Y')P^*(X' - X, Y' - Y)dX'dY'$$

According to Formula 9 above, the image plane intensity distribution is expressed by the formula below.

$$I(x,y) = F^{-1}[F[O(x,y)]OTF] \quad \text{Formula 11}$$

If the image plane intensity distribution and OTF are known, a geometric map of the light intensity distribution on the object surface on the image plane, i.e., an ideal optical image is expressed as the formula below.

$$O(x, y) = F^{-1}\left[\frac{F[I(x, y)]}{OTF}\right] \quad \text{Formula 12}$$

This operation is called deconvolution. As apparent from the structure of the formula, the deconvolution requires that OTF will never be zero. Even when images of different distances from the object are on the image plane, uniform ideal optical images can be obtained if the point image distribution of the objects are identical regardless of misfocus.

Figure 8:
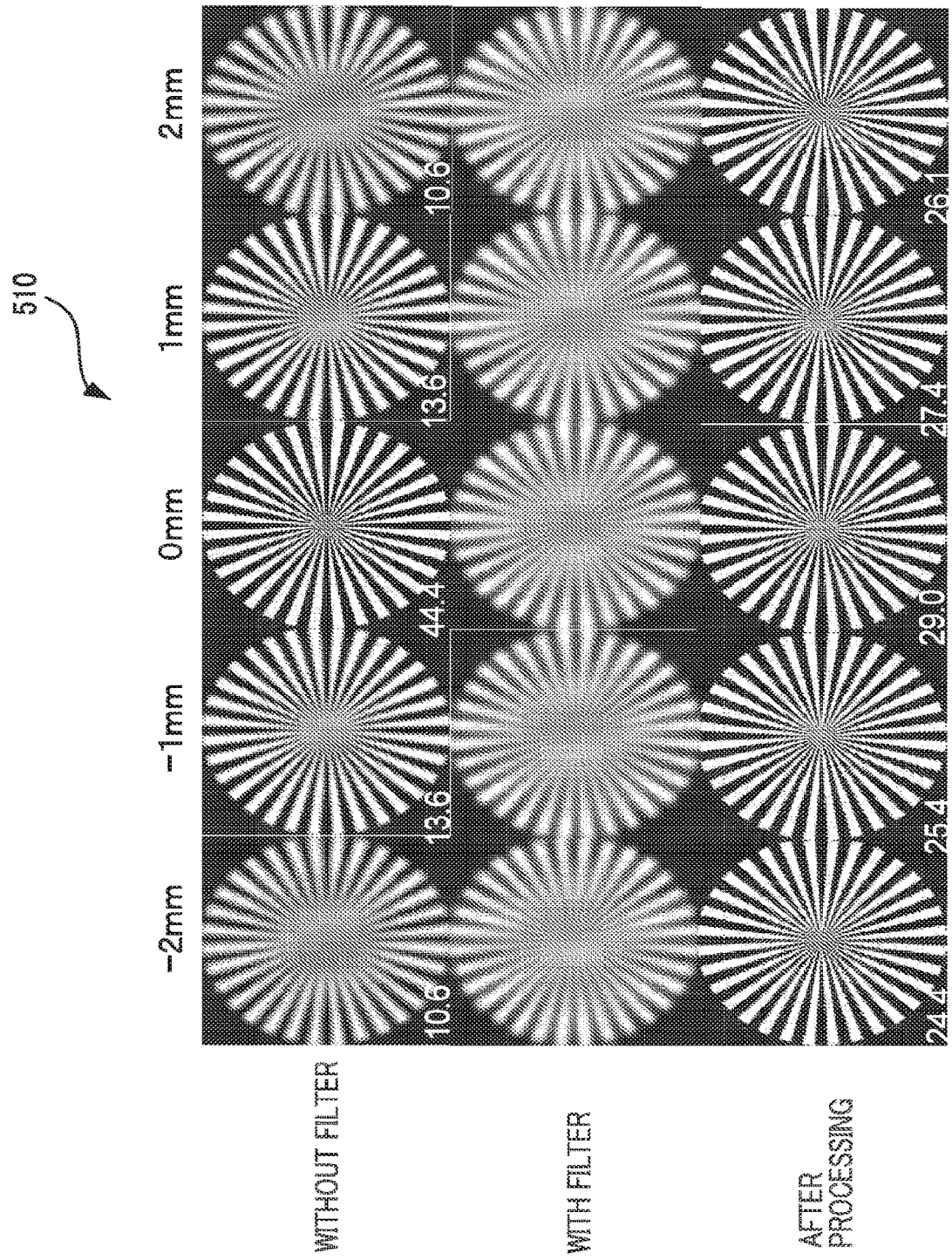
FIG. 8 is a diagram showing an example of comparing processing results of captured images depending on with or without the phase filter of the first embodiment.

FIG. 8 shows an example of comparison of processing results for captured images with or without the phase filter 101 of the first embodiment. The simulation condition for the simulation results shown in FIG. 8 is as follows: Focal length: 50 mm; Effective diameter: 15.625 mm; F number: 3.2; Wave length: 0.5 μm; Object distance: 710 mm; Sensor size: 15 mm; Annular zone pitch: 0.8 mm; Phase difference:

4.24λ; Odd case; Approximation degree: 8; Image size: 1024×1024. As OTF used for deconvolution, a mean value of OTFs for 0 mm and 1 mm of defocus. A tone of the image captured by a camera as the imaging optical system or the imaging system is assumed to be 12 bits. The original images are spoke-shaped monochrome images for 0 brightness and the maximum brightness. On the upper raw are shown ordinary captured images without phase filter 101, on the middle raw are shown images captured by a camera with the phase filter 101 of the first embodiment, and on the bottom raw are shown images resulted from deconvolution. On the other hand, the column direction represents a defocus amount on a sensor surface, namely −2 mm, −1 mm, 0 mm, 1 mm, 2 mm from left. The negative value here means that the sensor is placed near the lens, and the positive value means that the sensor is distant from the lens. At the left side under each image without the phase filer 101 and after deconvolution processing is indicated a calculation result of evaluation index value of each image with white characters. The evaluation value of images is a numerical value called Peak Signal to Noise Ration, PSNR, defined with the formula below.

$$PSNR = 20 \cdot \log_{10} \frac{Max}{\sqrt{\frac{1}{mn} \sum_{i=0}^{m-1} \sum_{j=0}^{n-1} [I(i, j) - O(i, j)]^2}} \quad \text{Formula 13}$$

Figure 9:
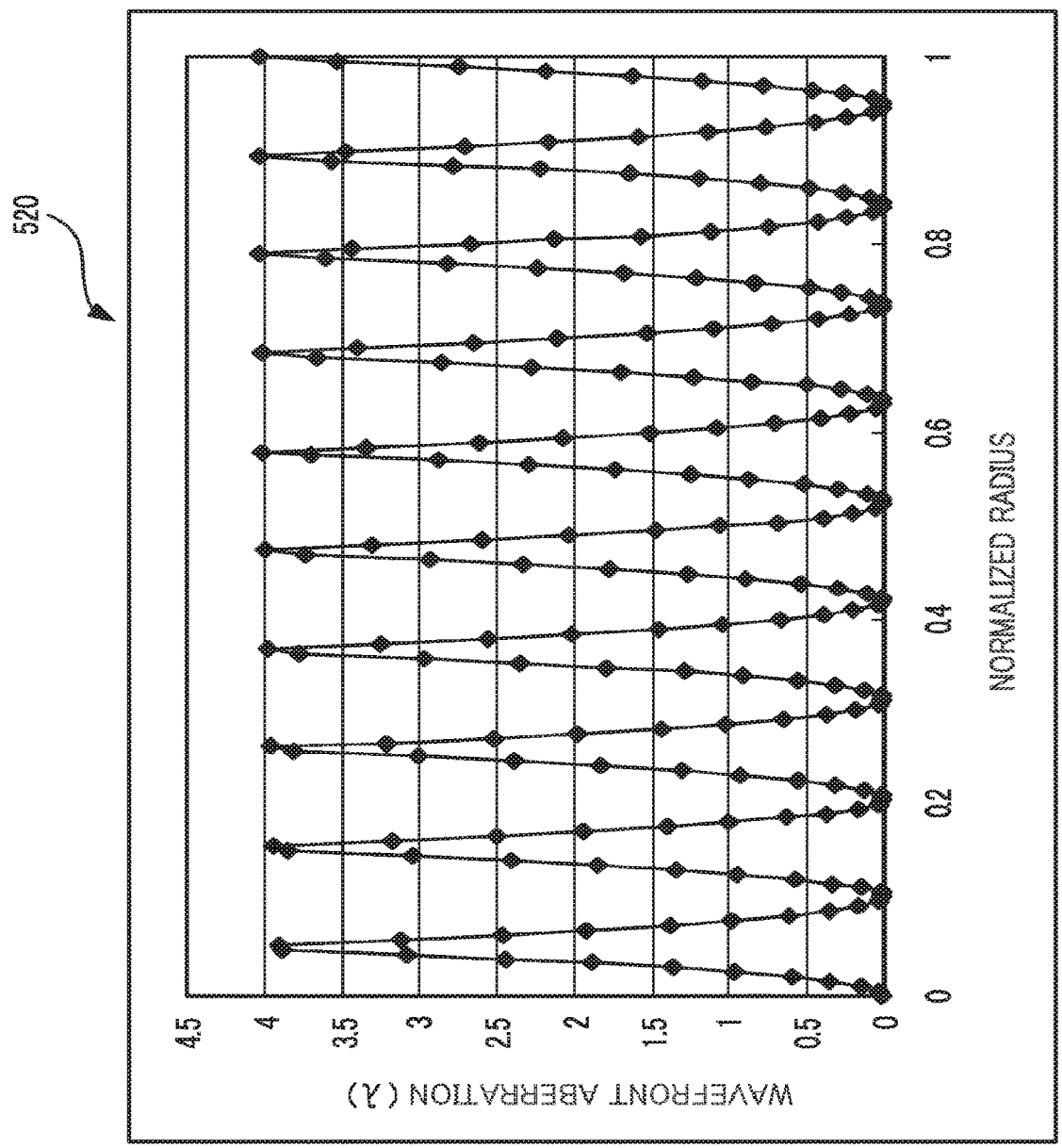
FIG. 9 is a diagram showing wavefront aberration on a pupil plane according to the phase filter of the first embodiment.
Figure 10:
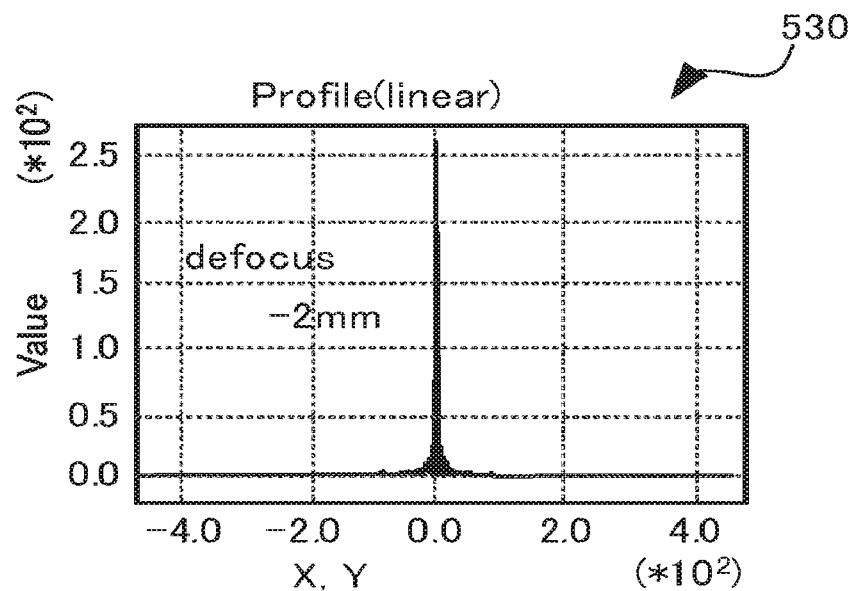
FIG. 10 is a diagram showing the first result of calculation of point distribution according to the phase filter of the first embodiment.
Figure 11:
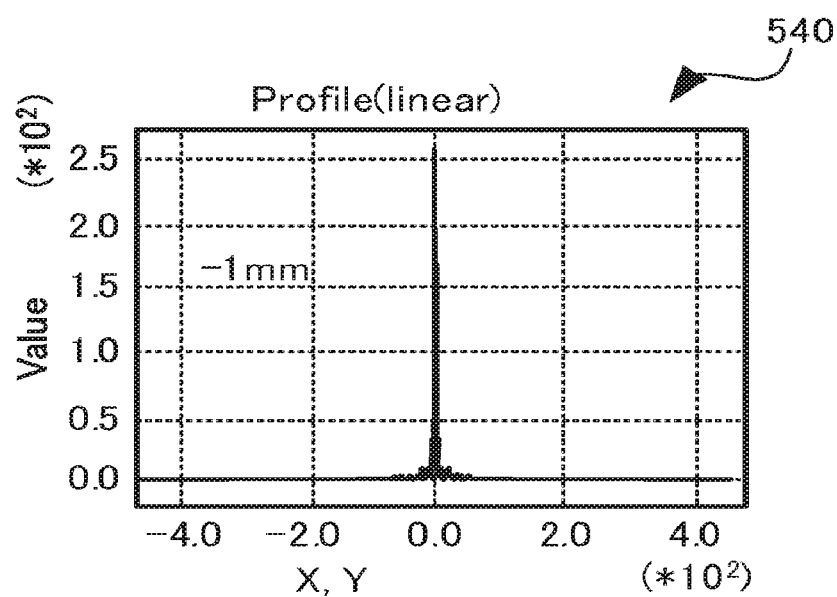
FIG. 11 is a diagram showing the second result of calculation of point distribution according to the phase filter of the first embodiment.
Figure 12:
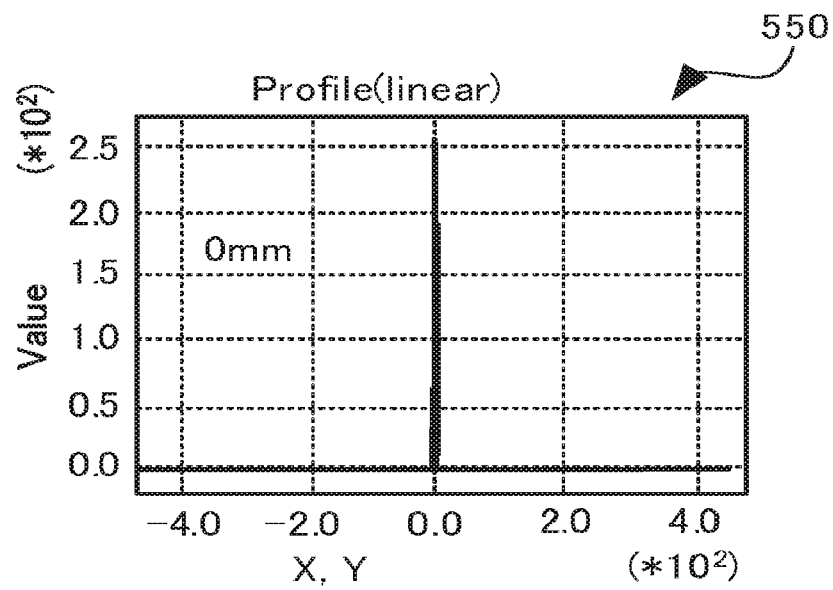
FIG. 12 is a diagram showing the third result of calculation of point distribution according to the phase filter of the first embodiment.
Figure 13:
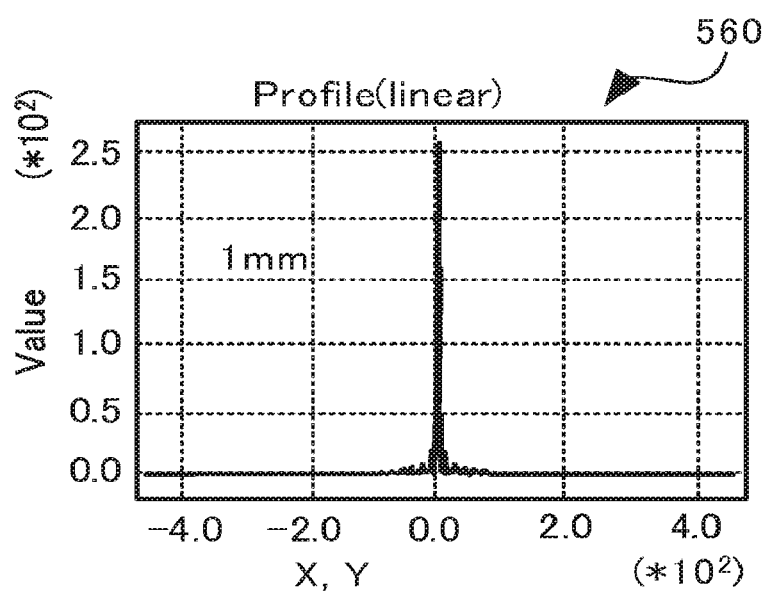
FIG. 13 is a diagram showing the fourth result of calculation of point image distribution according to the phase filter of the first embodiment.
Figure 14:
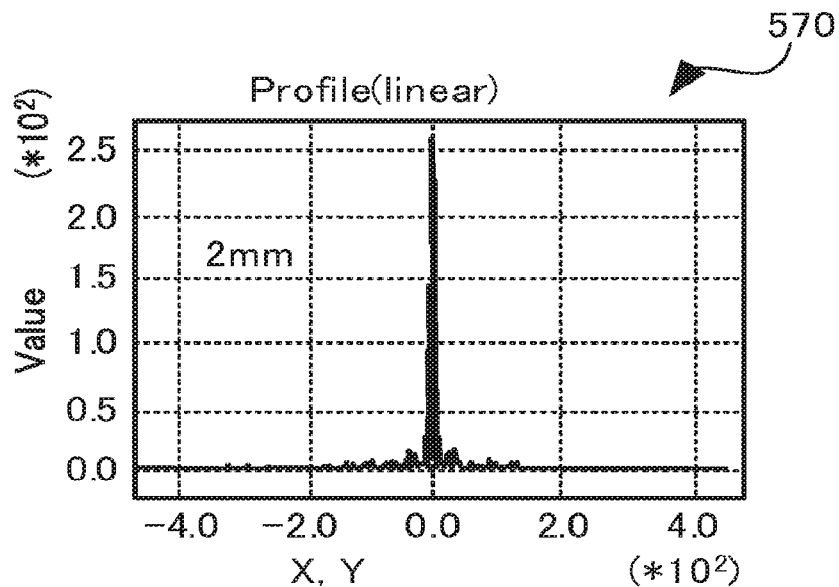
FIG. 14 is a diagram showing the fifth result of calculation of point image distribution according to the phase filter of the first embodiment.

Here, Max is a maximum brightness, m, n are lateral and vertical image size respectively, I(i, j) is an evaluation image and O(i, j) is an original image. According to the above results, though falling short of ordinary images without defocus, within the range of defocus from −2 mm to +2 mm, no specific image deterioration is seen and extension of focal depth is confirmed. FIG. 9 shows a wavefront aberration of a pupil plane with the phase filter 101 of the first embodiment, that is a phase distribution 520. Here, wavefront aberration with defocus is not included. The phase shift shaped a parabola cross-section is found to be added at each of the annular zones 111.

FIGS. 10-14 show calculation results of point image distribution function for the above condition. In each graph, a horizontal axis represents a pixel position of an image and a vertical axis represents brightness. The range of calculation area is 0.938 mm. From FIG. 10 to FIG. 14, the calculation results for the amount of defocus of −2, −1, 0, 1, 2 mm are shown. Though tendency of excessive narrowing of a light collecting spot for no defocus, it is seen that substantially the same spot size is obtained for the other cases.

Figure 15:
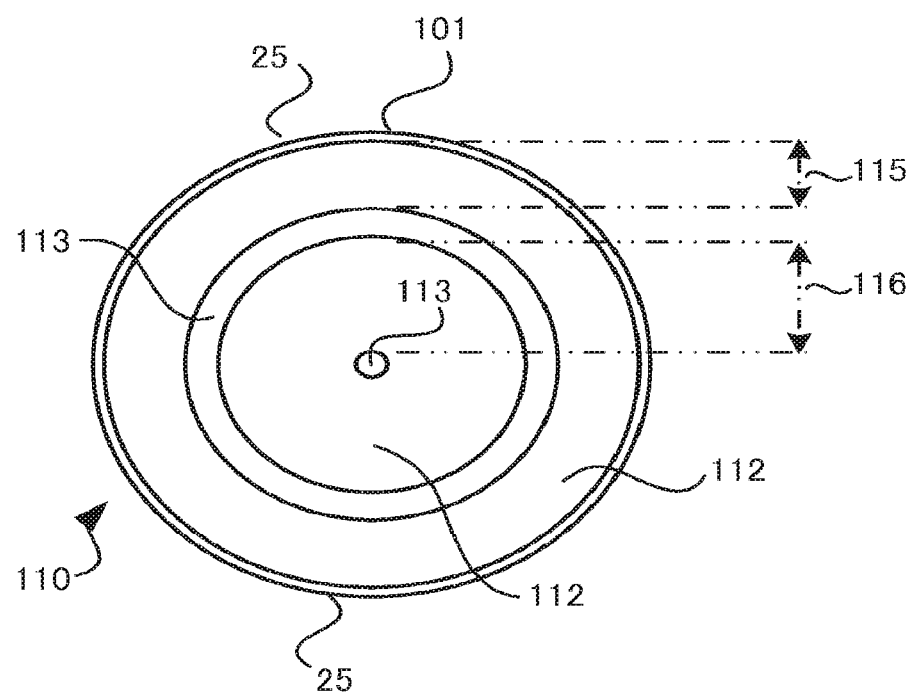
FIG. 15 is a plan view showing a structure of a phase filter of the second embodiment.
Figure 16:
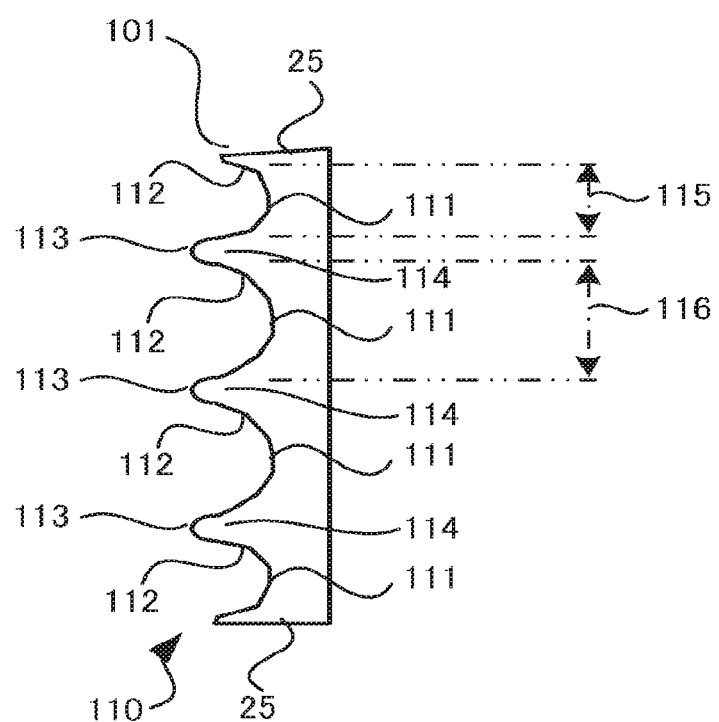
FIG. 16 is a side cross-sectional view showing the structure of the phase filter of the second embodiment.

In the first embodiment above, the phase filter 101 with the annular structure 110 having equal annular zone width or pitch is described. However, the width of the annular zone 111 of the phase filter 101 need not be the same for the annular zones. FIG. 15 shows a plan view of the phase filter 101 of the second embodiment and FIG. 1b shows a side cross-sectional view of the phase filter 101 of the second embodiment. In the second embodiment below, such an example will be described that the width of the annular zone 111 of the phase filter 101 is getting smaller from the optical axis 1 toward a peripheral part 25. In the examples in FIGS. 15 and 16, the width 115 of the outermost annular zone 111, in other words, the annular zone 111 closest to the peripheral part 25 is formed narrower than the width 116 of the next inner annular zone 111. The phase filter 101 has an annular structure 110 with the annular zone 111 including the concave surface 112 acting as a concave lens for incident light flux in a radial direction on a pupil plane and the annular zone 114 including the convex surface 113 acting as a convex lens alternatively.

Figure 17:
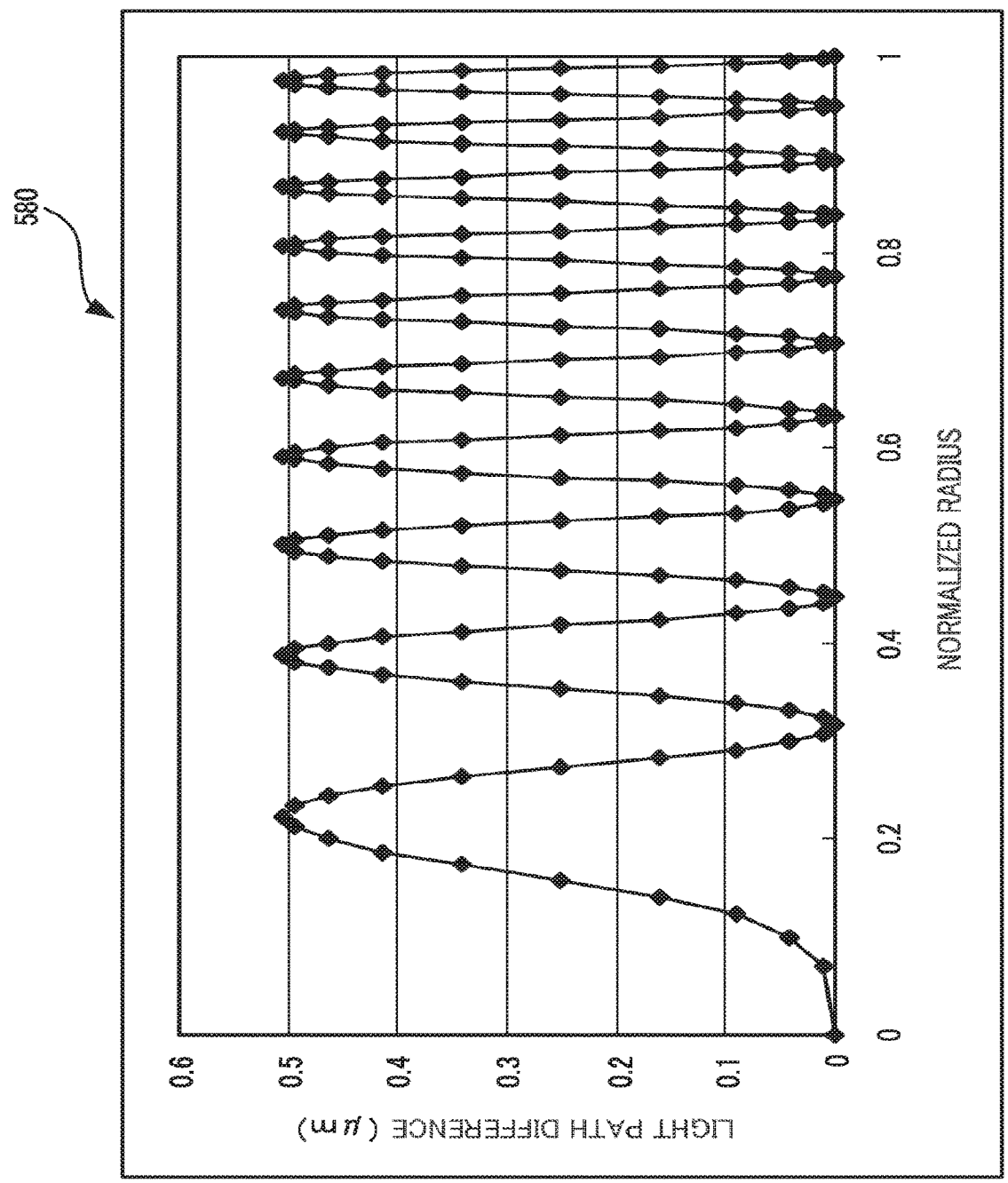
FIG. 17 is an example of a light path difference distribution according to the phase filter of the second embodiment.

FIG. 17 shows a wavefront aberration on a pupil plane with the phase filter 101 having the structure above, or a phase distribution 580. In the phase distribution 580, the horizontal axis represents a normalized radius of the pupil plane and the vertical axis represents a light path difference in μm. The phase distribution 580 shows that the width of the annular zone 111 is narrower as the normalized radius of the pupil plane increases, in other words, when the position of the annular zone 111 is closer to the peripheral part 25 of the phase filter 101. Employment of this type of structure in the phase filter 101 makes the area to which each annular zone occupies uniform and becomes more insensitive to variation in manufacturing. In the annular structure of the second embodiment, the phase difference is uniform regarding all the annular zones 111.

It is to be noted that refraction by the annular zone 111 does not affect for the area between the annular zones 111 of the phase filter 101 of the first embodiment, i.e., the annular zones each functioning as a convex lens, that is, the light flux entering the steep convex position. On the other hand, in the phase filter 101 in which the annular zone 111 acting as a concave lens as mentioned above and the annular zone 114 acting as a convex lens are alternatively arranged, it is enabled that the light flux entering the area close to the annular zone 114 in the concave surfaces 112 of the annular zones 111 is refracted with the convex lens function of the annular zone 114 as desired. Thus, the phase distribution 580 has a smooth profile without showing a steep peak as shown in the phase distribution 520 for the first embodiment in FIG. 9. Since the phase filter 101 of this structure does not have the above steep convex parts between the annular zones, occurrence of chipping of the phase filter 101 can be avoided. It is to be noted that, though the annular zone 111 as a concave lens and the annular zone 114 as a convex lens are described above for convenience, the width of one annular zone is defined with practically assuming the area incorporating the annular zones 111 and 114 as one annular zone.

Figure 18:
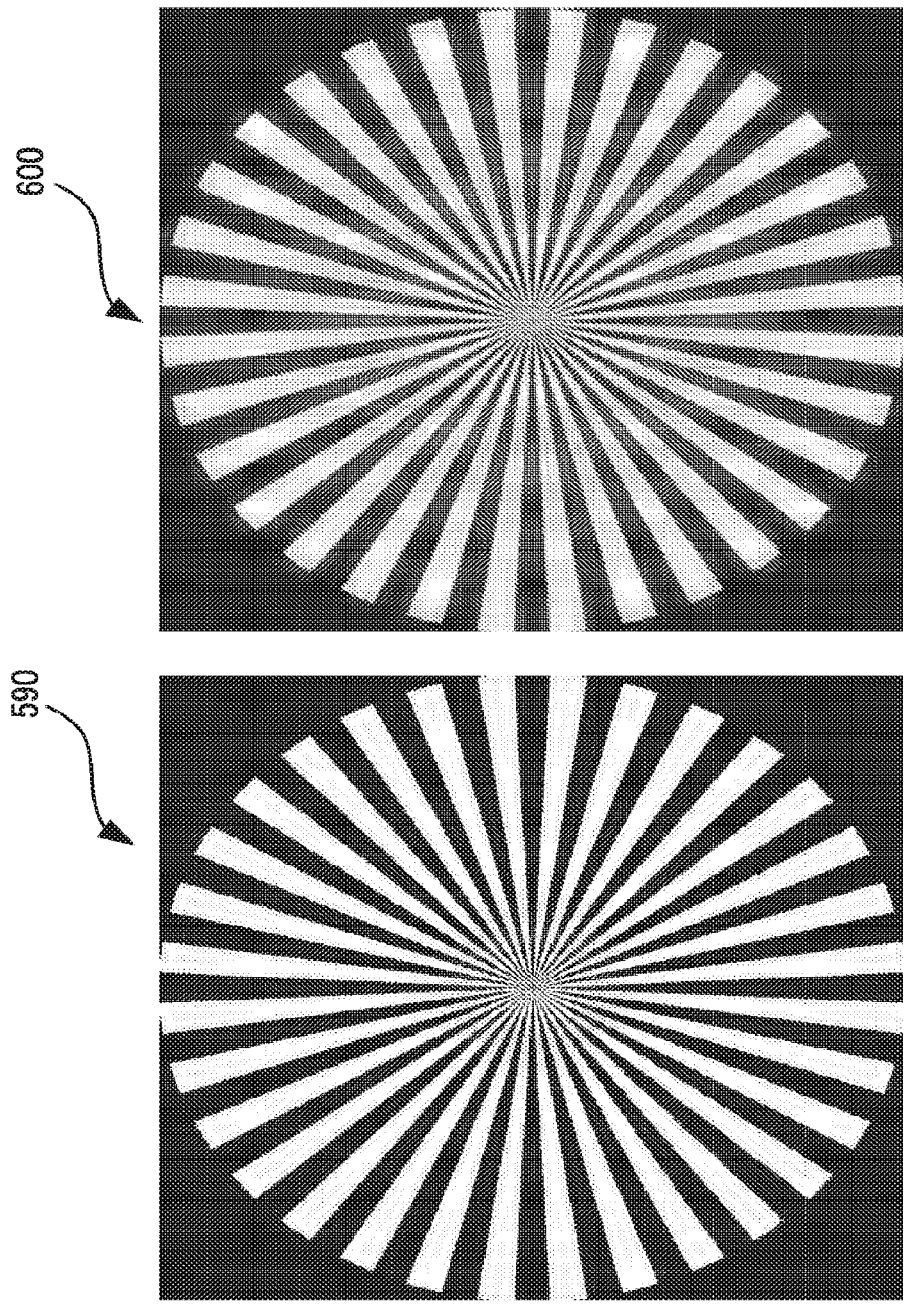
FIG. 18 is an image of the result of deconvolution according to the second embodiment.

FIG. 18 shows an image after deconvolution when the phase filter 101 of the second embodiment above was employed. The conditions other than the phase filter are the same as those for the first embodiment. The left side image 590 shows that without defocus, i.e., Just focus, and the right side image 600 is for that with the defocus of 2 mm. The image according to the second embodiment is slightly inferior to the first embodiment in image quality. However, the image for the second embodiment has an effect of focal depth extension as the first embodiment.

Here, while the tilt angle of the retracted rays of light increases as the tilt of the concave surface 112 of the phase filter 101 increases, when the depth of the concave surface 112 is the same at the peripheral part 25 and at the vicinity of the optical axis 1, change of the point of intersection of the ray of light and the optical axis 1 increases as the point comes closer to the optical axis 1. The above is assumed to be correspondent to fact that contribution to the focal depth extension is larger as closer to the optical axis 1 and is smaller as closer to the peripheral part 25. Accordingly, an example of such a phase filter 101 will be described below that the depth of the concave surface 112 of the annular zone 111 is deeper as the concave surface 112 closer to the peripheral part 25. It is to be noted that while the depth of the concave surface 112 of the annular zone 111 is deeper as the concave surface 112 closer to the peripheral part 25, the width of the annular zone is assumed to be uniform for all the annular zones.

Figure 19:
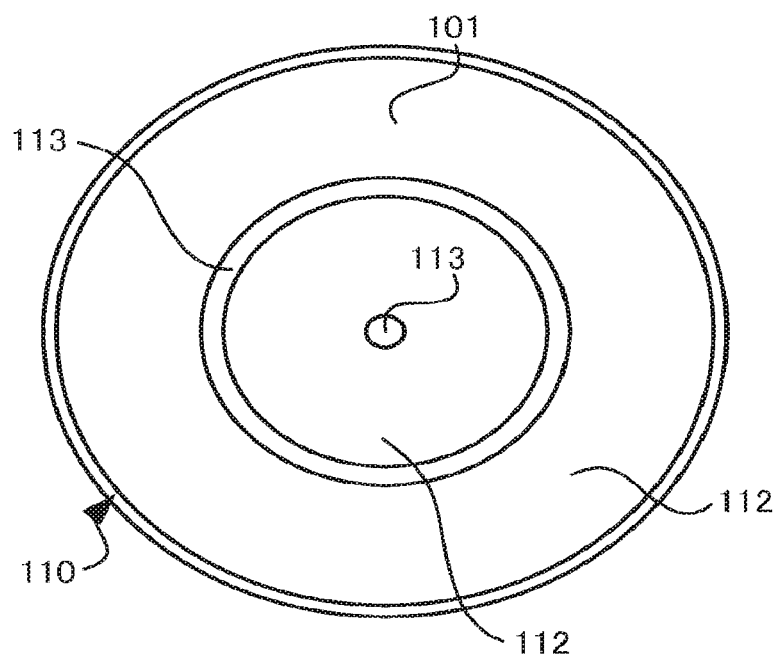
FIG. 19 is a plan view of a structure of a phase filter of the third embodiment.
Figure 20:
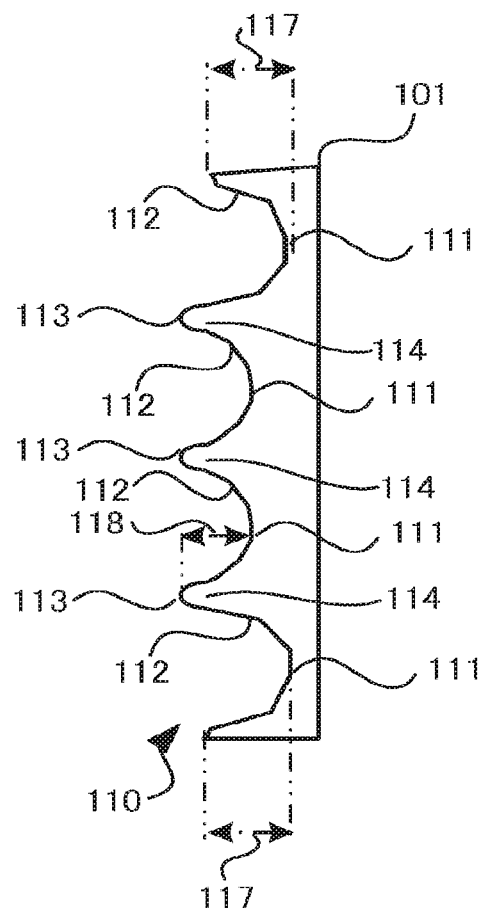
FIG. 20 is a side cross-sectional view showing the structure of the phase filter of the third embodiment.

FIG. 19 is a plan view showing a structure of the phase filter of the third embodiment, and FIG. 20 is a side cross-sectional view showing the structure of the phase filter of the third embodiment. In the example shown in FIGS. 19 and 20, the depth 117 of the concave surface 112 of the outermost annular zone 111 arranged closest to the peripheral part 25 is deeper than the depth 118 of the concave surface 112 of the annular zone 111 arranged inside adjacent thereto. The phase filter 101 has an annular structure 110 with the annular zone 111 including the concave surface 112 acting as a concave lens for incident light flux in a radial direction of a pupil plane and the annular zone 114 including the convex surface 113 acting as a convex lens alternatively.

Figure 21:
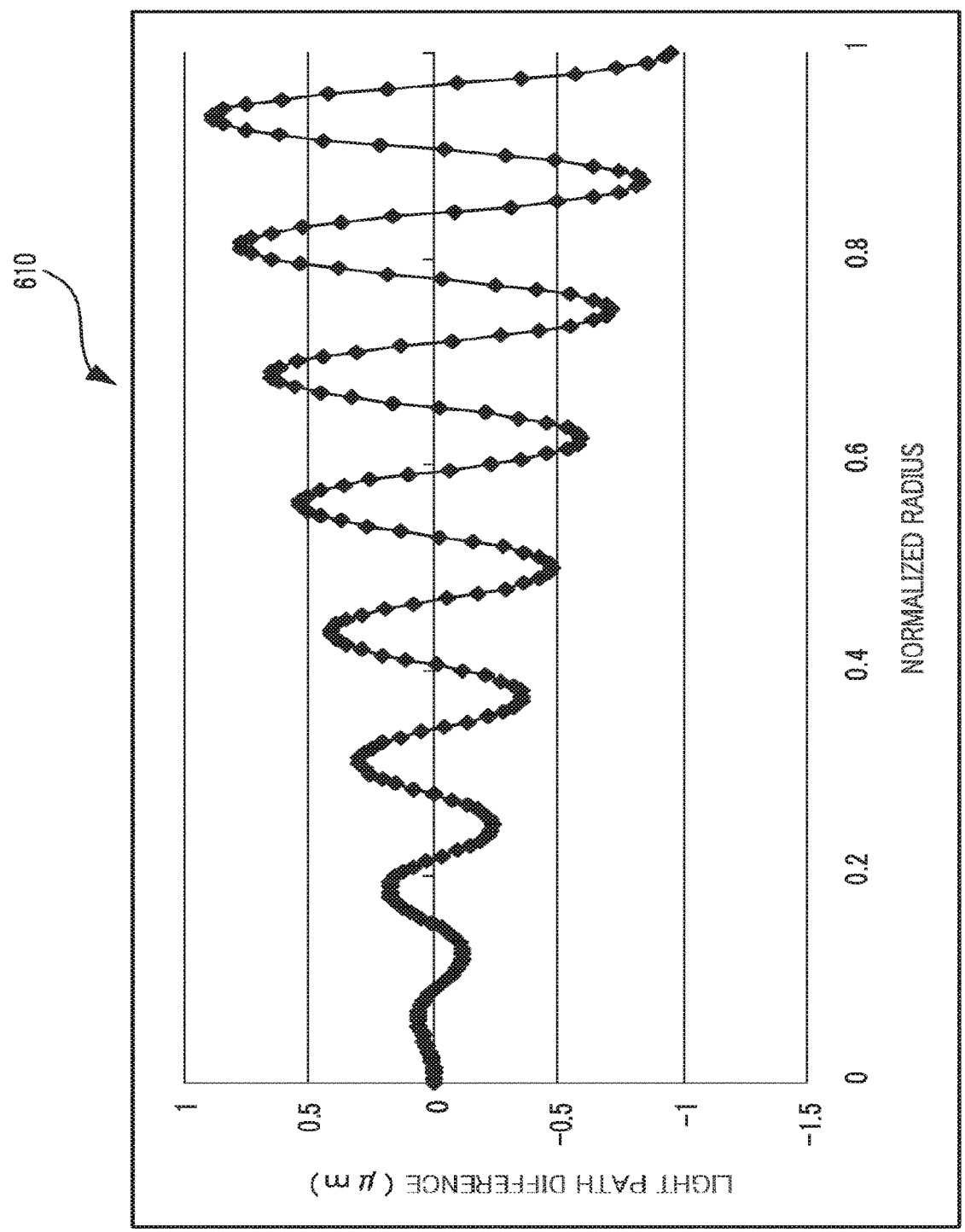
FIG. 21 is an example of a light path difference distribution according to the phase filter of the third embodiment.

FIG. 21 shows a phase distribution 610 or a wavefront aberration of a pupil plane by the phase filter 101 having the structure above. As shown in the phase distribution 610, as the depth of the concave surface 112 of the annular zone 111 of the phase filter 101 increases, the change in the light path difference as well as the variation in phase shift becomes larger.

Figure 22:
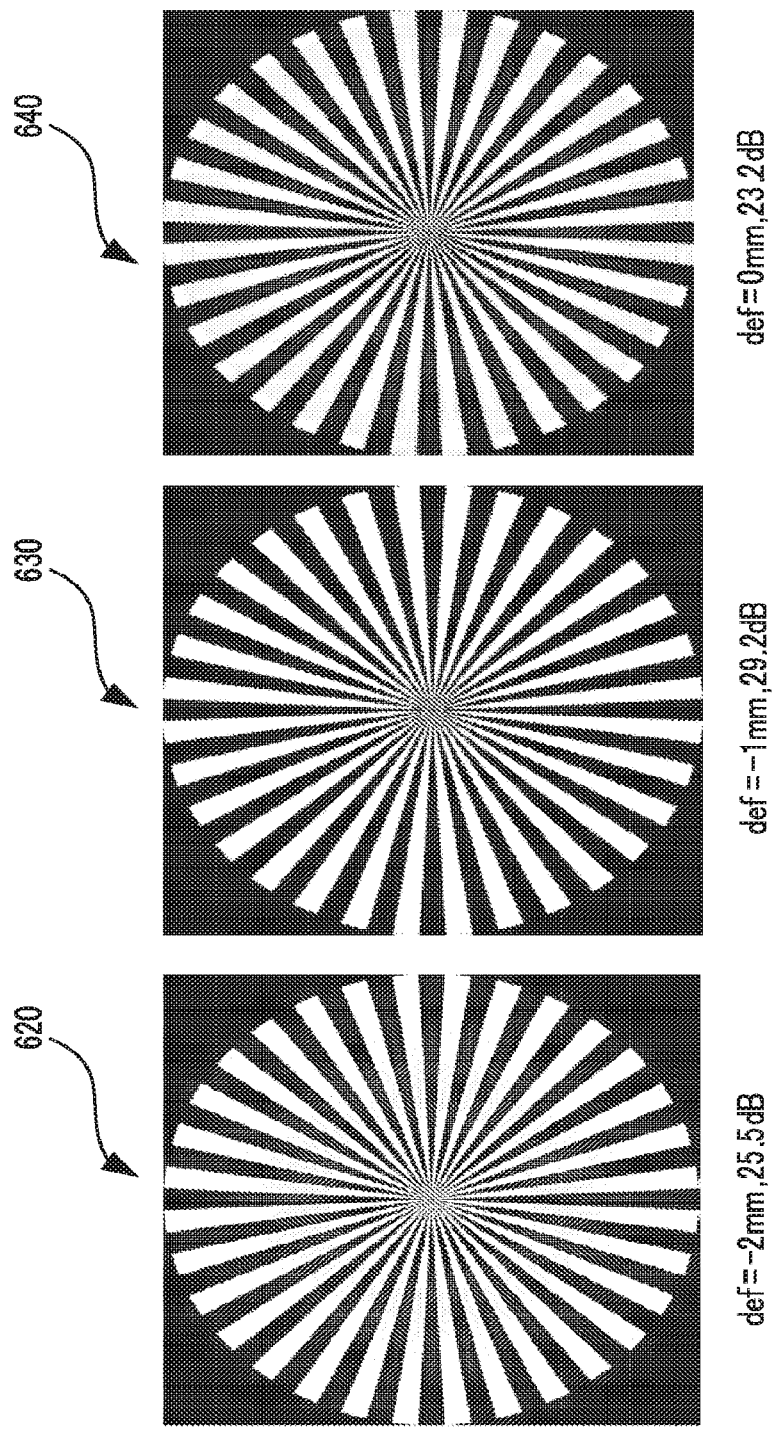
FIG. 22 is an image of the result of deconvolution according to the third embodiment.

FIG. 22 shows an image after deconvolution when the phase filter 101 of the third embodiment is used. Here, the conditions other than the phase filter are the same as those for the first embodiment. On the paper, the left side image 620 has defocus of −2 mm, the center image 630 has defocus of −1 mm, and the right side image 640 has defocus of 0 mm. The dB value shown below each image is a Peak Signal-to-Noise Ratio, PSNR. As shown above, it is appreciated that the image quality substantially equal to those in the first embodiment is achieved.

As described hereinabove, the phase filter 101 provides technique for extending substantial focal depth in the imaging optical system 150, which may be applied to various uses. In accordance to the uses to which applied, examples of the apparatuses using the phase filter 101 will be described below.

Figure 23:
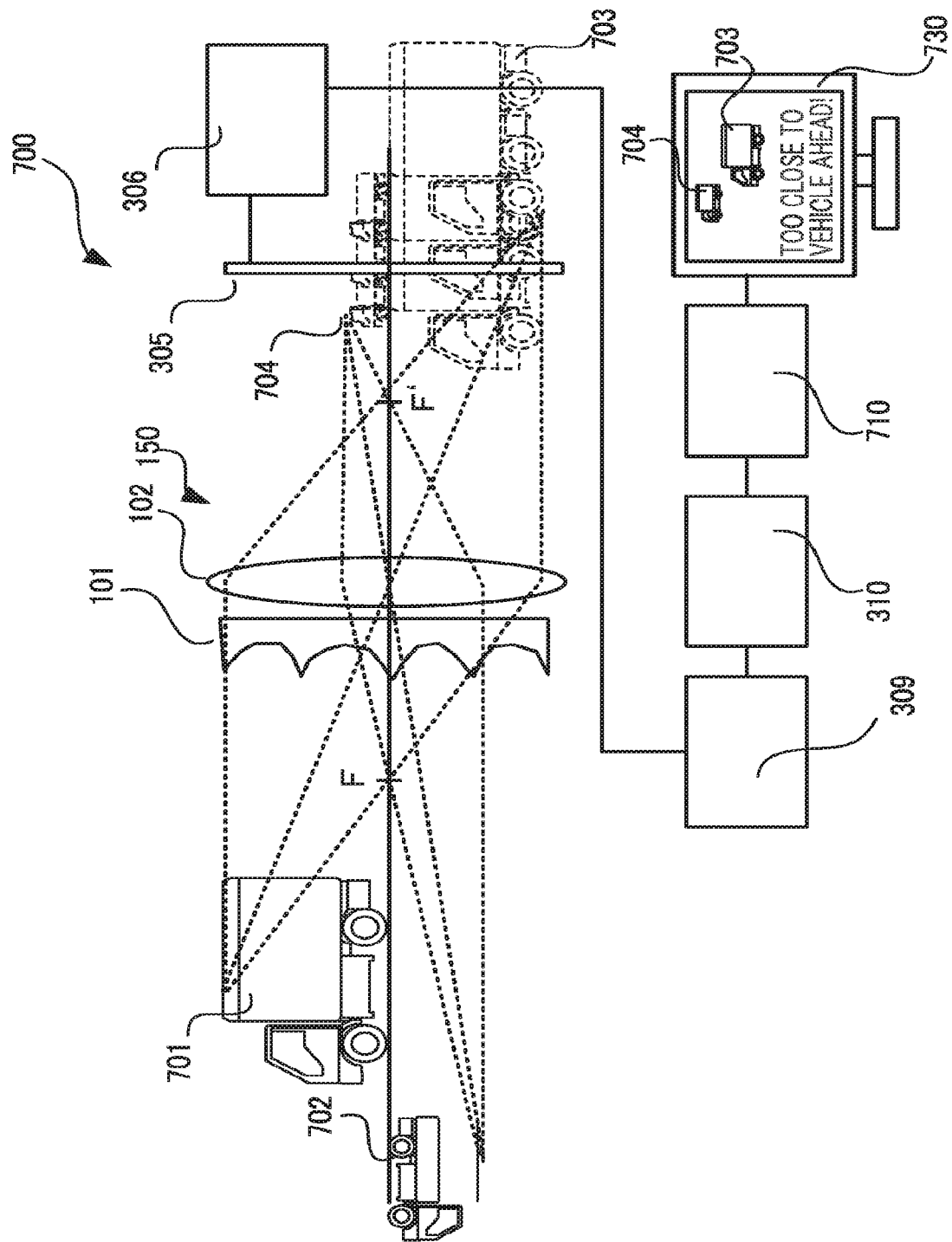
FIG. 23 is an exemplary configuration of a vehicle driving support apparatus of the second mode of the present invention.
Figure 24:
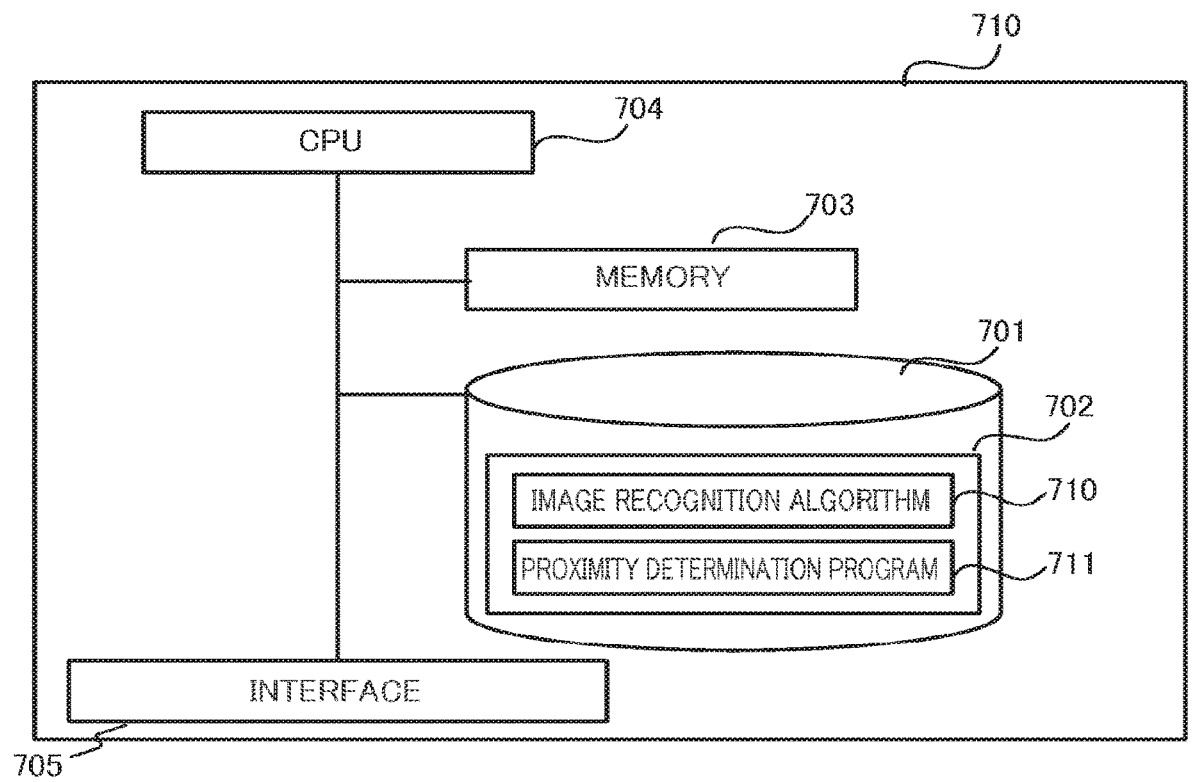
FIG. 24 is an exemplary configuration of hardware of an information processing apparatus provided to the vehicle driving supporting apparatus of the second mode of the present invention.

FIG. 23 is an exemplary configuration of a vehicle driving support apparatus 700 of the second mode of the present invention, and FIG. 24 is an exemplary configuration of hardware of an information processing apparatus 710 provided to the vehicle driving supporting apparatus 700. For example, an apparatus for capturing the images around a vehicle with an onboard camera into which the phase filter 101 is incorporated and detecting obstacles for avoiding hitting thereto based on captured images by the onboard camera, that is, a vehicle driving support apparatus 700 may be assumed.

Similar to the imaging system 300 shown in the first mode of the present invention, the vehicle driving support apparatus 700 comprises an image sensor 305, an image signal output circuit 306, a deconvolution preprocess circuit 309, and a deconvolution filter circuit 310, and further includes an information processing apparatus 710. The processing results by the information processing apparatus 710 are to be displayed on the monitor display of a car navigation apparatus 730 provided to a vehicle.

According to the configuration in this case, the lights reflected by other vehicles 701, 702 positioned around, for example, ahead of the vehicle equipped with the vehicle driving support apparatus 700 enter the image forming lens 102 via the phase filter 101 in the imaging optical system 150, and form images 703, 704 having uniform degree of blur in the direction of the optical axis 1. In the vehicle driving support apparatus 700, the image sensor 305 receives sensing data of the images 703, 704 and forwards the same to the image signal output circuit 306. The deconvolution preprocessing circuit 309 receives the image signal as the output of the image signal output circuit 306 and converts the image signal into the image signal of the digital image data type suitable to filtering calculation at the deconvolution filter circuit 310. The output signal from the deconvolution preprocessing circuit 309 are inputted to the information processing apparatus 710 after filtering processing at the deconvolution filter circuit 310. Then, the output signal is subject to the predetermined processing to realize at the car navigation apparatus 730 displaying images focused on the close vehicle 701 and the distant vehicle 702 and audio output of alarm notification or the like in accordance with the image display.

A hardware configuration of the information processing apparatus 710 provided to the above vehicle driving support apparatus 700 will be described below. The information processing apparatus 710 comprises a storage device 701 configured with appropriate non-volatile storage device such as a hard disk drive, a memory 703 configured with a volatile memory device such as RAM, a CPU 704 for reading a program 702 stored in the storage device 701 into a memory 703, executing the same, totally controlling the apparatus itself, and performing various decision, operation and control processes, 705 such as a display, a keyboard, and a mouse for receiving user inputs, outputting results, etc. It is to be noted that as the program 702, at least an image recognition program 710 for implementing functions required for the vehicle driving support apparatus 700 and a proximity determination program 711. The processing with the program 702 will be described later.

Figure 25:
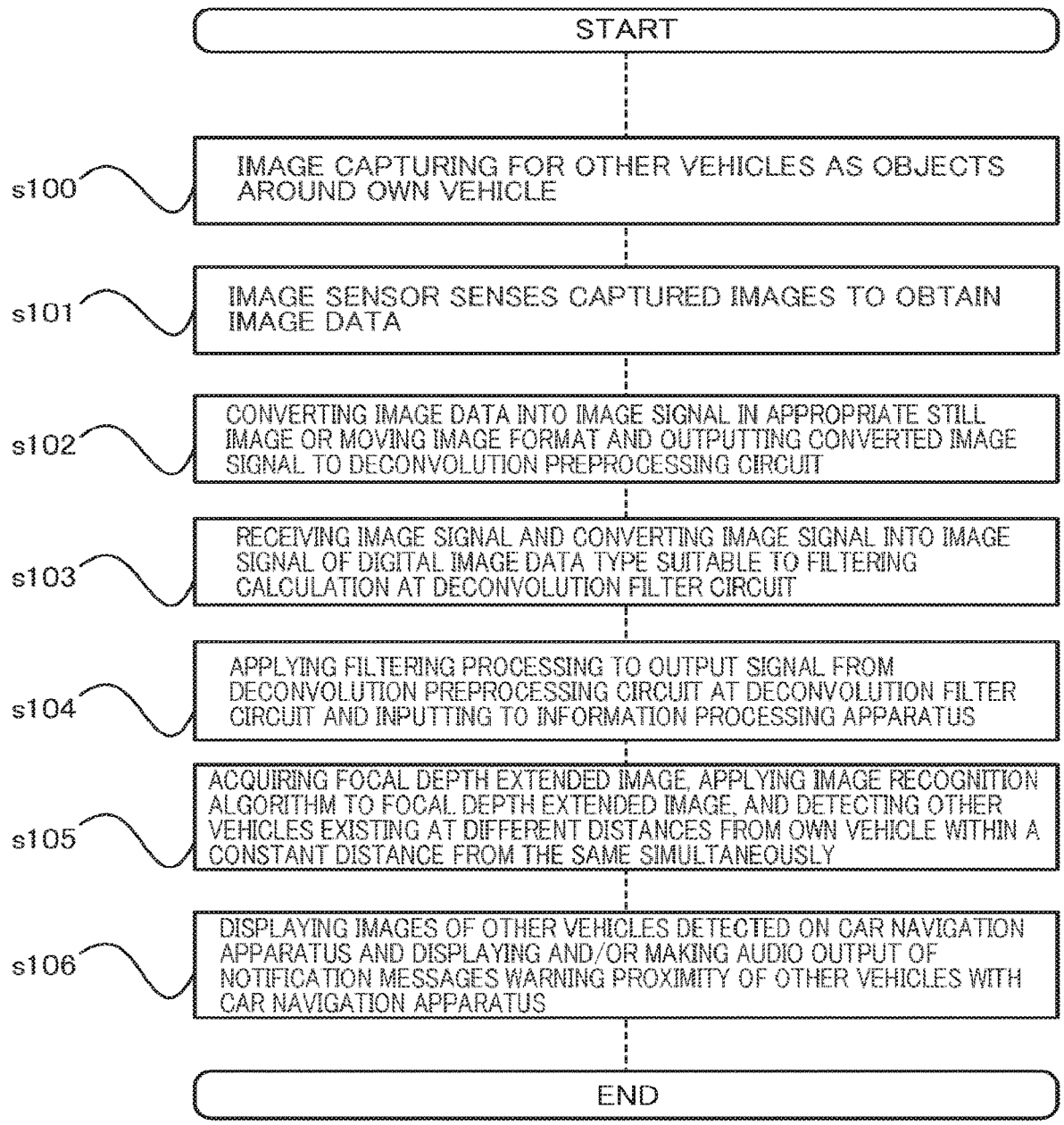
FIG. 25 is an exemplary processing flow carried out by the vehicle driving supporting apparatus of the second mode of the present invention.

Then, referring to FIG. 25, the processing flow carried out by the vehicle driving support apparatus 700 will be described. The imaging optical system 150 of the vehicle driving support apparatus 700 captures images of the other vehicles 701, 702 as an object around the vehicle (s100), and the image sensor 305 senses the captured images 703, 704 to obtain the image data (s101).

The image sensor 305 provides the image signal output circuit 306 with the above image data as an image signal. The image signal output circuit 306 converts an output signal from the above image sensor 305 into an image signal in an appropriate still image or a moving image format while maintaining information of maximum resolution capable of outputting by the image sensor 305 and outputting the converted image signal to the deconvolution preprocessing circuit 309 (s102).

The deconvolution preprocessing circuit 309 receives the image signal as the output of the image signal output circuit 306 and converts the image signal into the image signal of the digital image data type suitable to filtering calculation at the deconvolution filter circuit 310 (s103). The output signal from the deconvolution preprocessing circuit 309 is subject to filtering processing at the deconvolution filter circuit 310 and inputted to the information processing apparatus 710 (s104).

The information processing apparatus 710 acquires output data from the deconvolution filter circuit 310, i.e., a focal depth extended image, applies the image recognition algorithm 710 for recognition of vehicles to the focal depth extended image, and detects a plurality of objects such as other vehicles 701, 702 existing at the different distances from the own vehicle within a constant distance from the same simultaneously (s105). The image recognition algorithm 710 identifies the areas corresponding to vehicle shapes with the areas of shapes and/or sizes of the pixel groups of predetermined colors for example, for the pixels constituting the original image and performs image processing such as highlighting of the identified areas.

The information processing apparatus 710 displays the images 703, 704 of the other vehicles 701, 702 detected at step s105 on the car navigation apparatus 730 and displays and/or makes audio output of notification messages warning proximity of the other vehicles 701, 702 by the car navigation apparatus 730 (s106). According to the vehicle driving support apparatus 700, simultaneous detection of obstacles existing at close and distant positions from the vehicle, and improving safety for driving vehicles can be accomplished.

Figure 26:
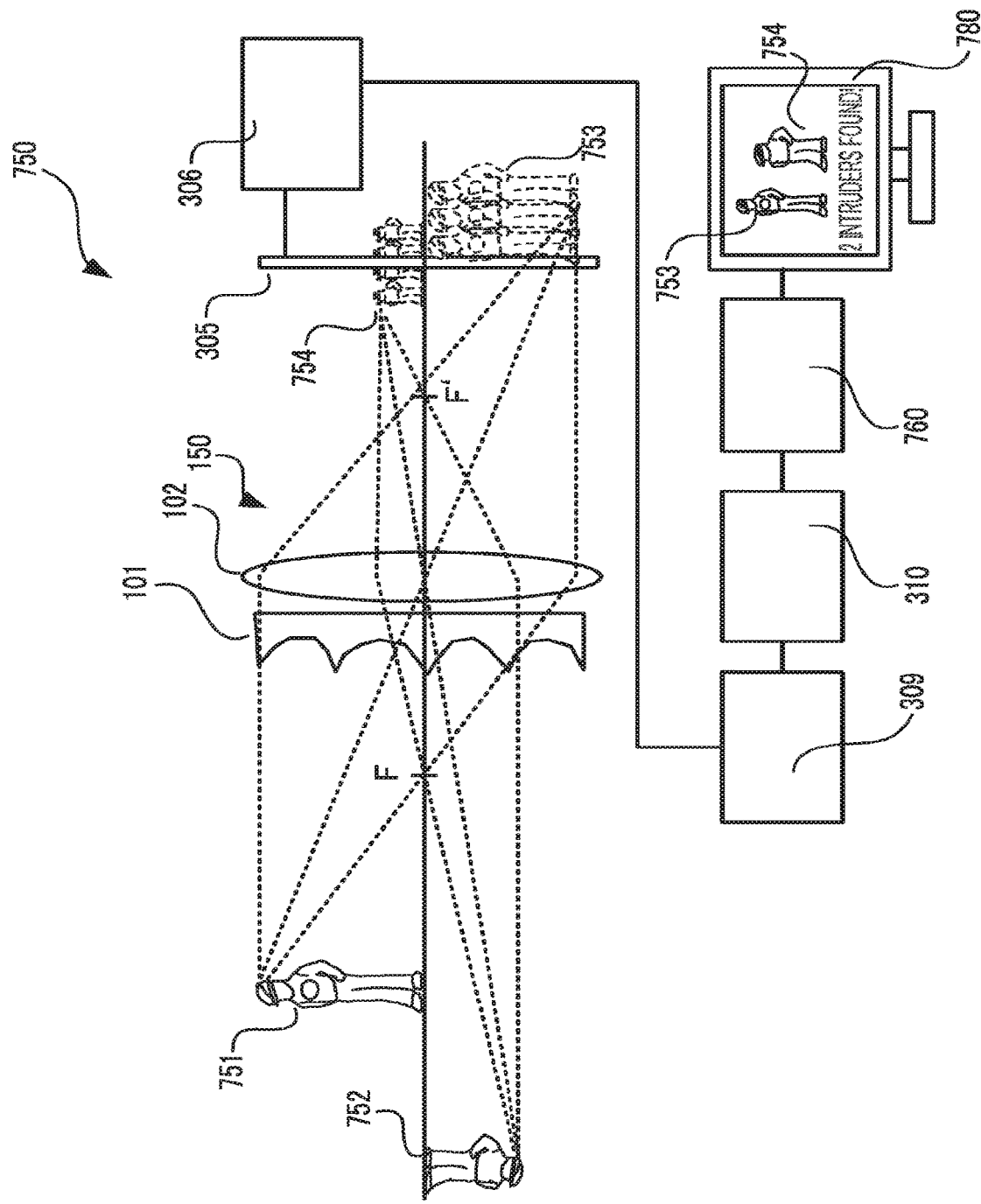
FIG. 26 is an exemplary configuration of a monitoring apparatus of the third mode of the present invention.
Figure 27:
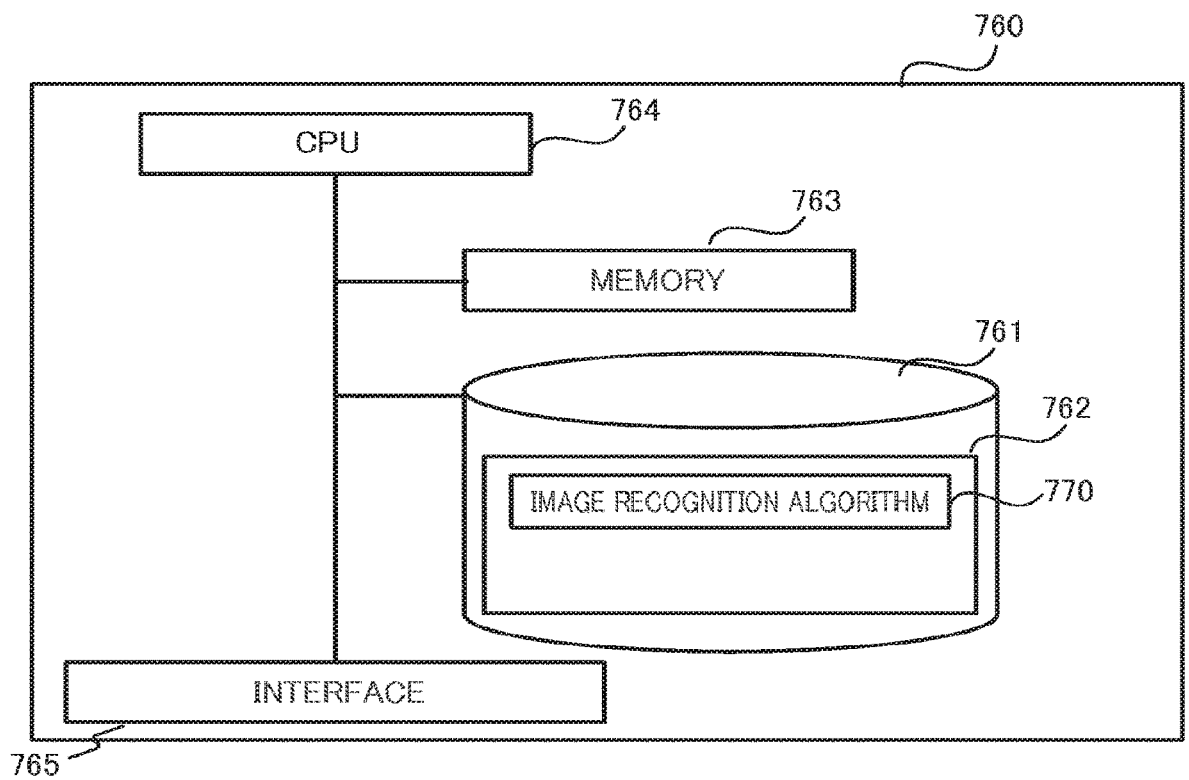
FIG. 27 is an exemplary configuration of hardware of an information processing apparatus provided to the monitoring apparatus of the third mode of the present invention.

In addition to the above, an apparatus for capturing images of suspicious persons and/or intruders being in a predetermined monitoring target area with a monitoring camera incorporating the phase filter 101 and performing predetermined monitoring processing based on the captured images by the monitoring camera, i.e., a monitoring apparatus 750 may be realized. FIG. 26 is an exemplary configuration of a monitoring apparatus of the third mode of the present invention. FIG. 27 is an exemplary configuration of hardware of an information processing apparatus 760 provided to the monitoring apparatus 750 of the third mode of the present invention.

Similar to the imaging system 300 shown in the first mode of the present invention, the monitoring apparatus 750 comprises an image sensor 305, an image signal output circuit 306, a deconvolution preprocess circuit 309, and a deconvolution filter circuit 310, and further includes an information processing apparatus 760. The processing results by the information processing apparatus 760 are to be displayed on the monitor display 780.

According to the configuration in this case, the lights reflected by the persons 751, 752 being in the monitoring target area extending around the monitoring apparatus 750 enter the image forming lens 102 via the phase filter 101 in the imaging optical system 150, and form images 753, 754 having uniform degree of blur in the direction of the optical axis 1. In the monitoring apparatus 750, the image sensor 305 receives sensing data of the images 753, 754 and forwards the same to the image signal output circuit 306. The deconvolution preprocessing circuit 309 receives the image signal as the output of the image signal output circuit 306 and converts the image signal into the image signal of the digital image data type suitable to filtering calculation at the deconvolution filter circuit 310. The output signal from the deconvolution preprocessing circuit 309 are inputted to the information processing apparatus 760 after filtering processing at the deconvolution filter circuit 310. Then, the output signal is subject to the predetermined processing to realize at the monitor display 780 displaying images focused on the close person 751 and the distant person 752 and audio output of alarm notification or the like in accordance with the image display.

A hardware configuration of the information processing apparatus 760 provided to the above monitoring apparatus 750 will be described below. The monitoring apparatus 750 comprises a storage device 761 configured with appropriate non-volatile storage device such as a hard disk drive, a memory 763 configured with a volatile memory device such as RAM, a CPU 764 for reading a program 762 stored in the storage device 761 into a memory 763, executing the same, totally controlling the apparatus itself, and performing various decision, operation and control processes, 765 such as a display, a keyboard, and a mouse for receiving user inputs, outputting results, etc. It is to be noted that as the program 762, at least an image recognition program 770 for implementing functions required for the monitoring apparatus 750. The processing with the program 702 will be described later.

Figure 28:
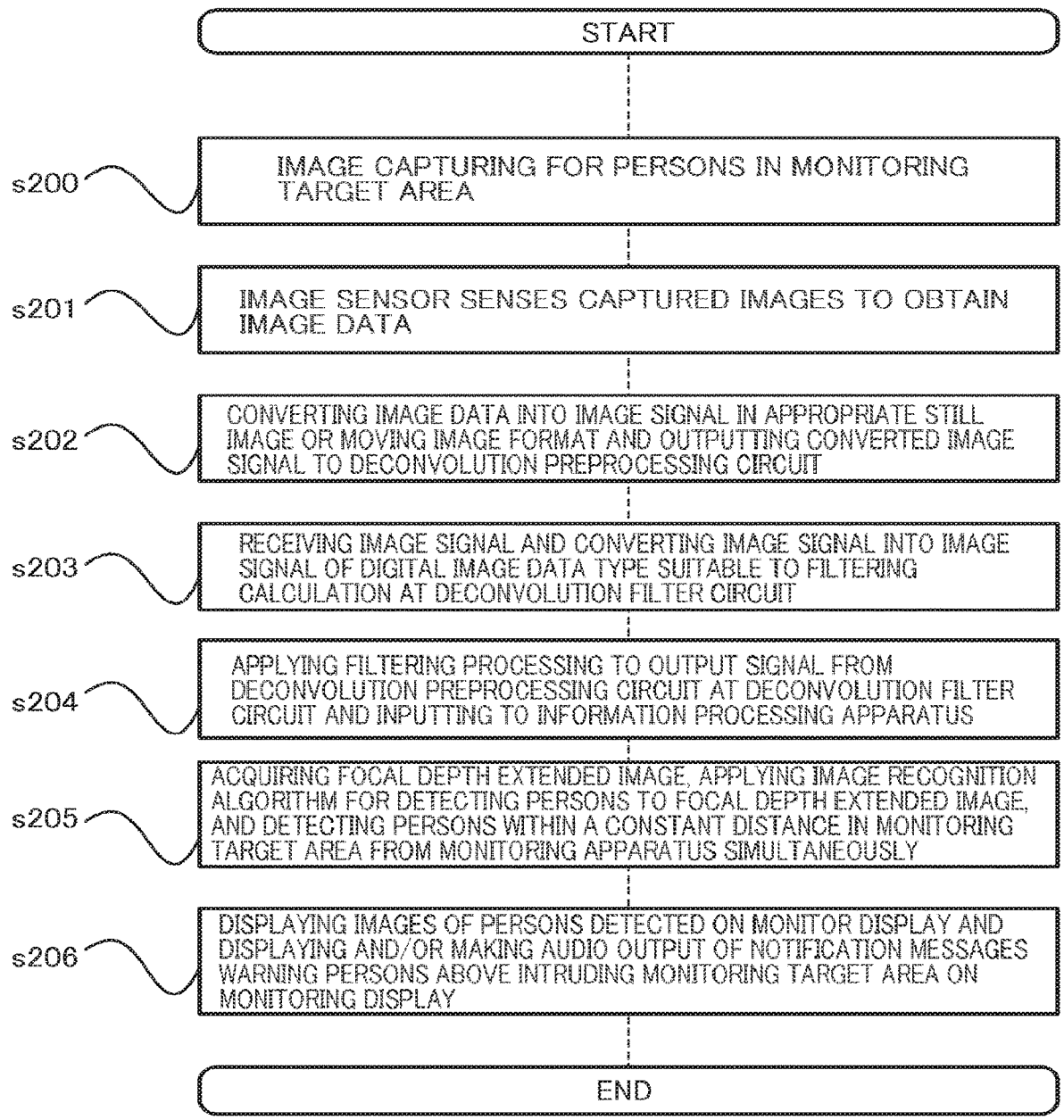
FIG. 28 is an exemplary processing low carried out by the monitoring apparatus of the third mode of the present invention.

Then, referring to FIG. 28, the processing flow carried out by the monitoring apparatus 750 will be described. The imaging optical system 150 of the monitoring apparatus 750 captures images of the persons 751, 752 being in the monitoring target area (s200), and the image sensor 305 senses the captured images 753, 754 to obtain the image data (s201).

The image sensor 305 provides the image signal output circuit 306 with the above image data as an image signal. The image signal output circuit 306 converts an output signal from the above image sensor 305 into an image signal in an appropriate still image or a moving image format while maintaining information of maximum resolution capable of outputting by the image sensor 305 and outputting the converted image signal to the deconvolution preprocessing circuit 309 (s202)

The deconvolution preprocessing circuit 309 receives the image signal as the output of the image signal output circuit 306 and converts the image signal into the image signal of the digital image data type suitable to filtering calculation at the deconvolution filter circuit 310 (s203). The output signal from the deconvolution preprocessing circuit 309 is subject to filtering processing at the deconvolution filter circuit 310 and inputted to the information processing apparatus 760 (s204).

The information processing apparatus 760 acquires output data from the deconvolution filter circuit 310, i.e., a focal depth extended image, applies the image recognition algorithm 770 for recognition of persons to the focal depth extended image, and detects a plurality of objects such as the persons 751, 752 being in the monitoring target area at the different distances from the own monitoring apparatus 750 within a constant distance from the same simultaneously (s205). The image recognition algorithm 770 identifies the areas corresponding to person shapes with the areas of shapes and/or sizes of the pixel groups of predetermined colors for example, for the pixels constituting the original image and performs image processing such as highlighting of the identified areas.

The information processing apparatus 760 displays the images 753, 754 of the persons 751, 752 detected at step s205 on the monitor display 780 and displays and/or makes audio output of notification messages warning that the persons 751, 752 have intruded into the monitoring target area by the monitor display 780 (s206). According to the monitoring apparatus 750, improvement of a recognition rate for suspicious persons and/or criminals and the like intruded into or existing in the monitoring target area without regard to a distance from the imaging optical system can be accomplished.

Figure 29:
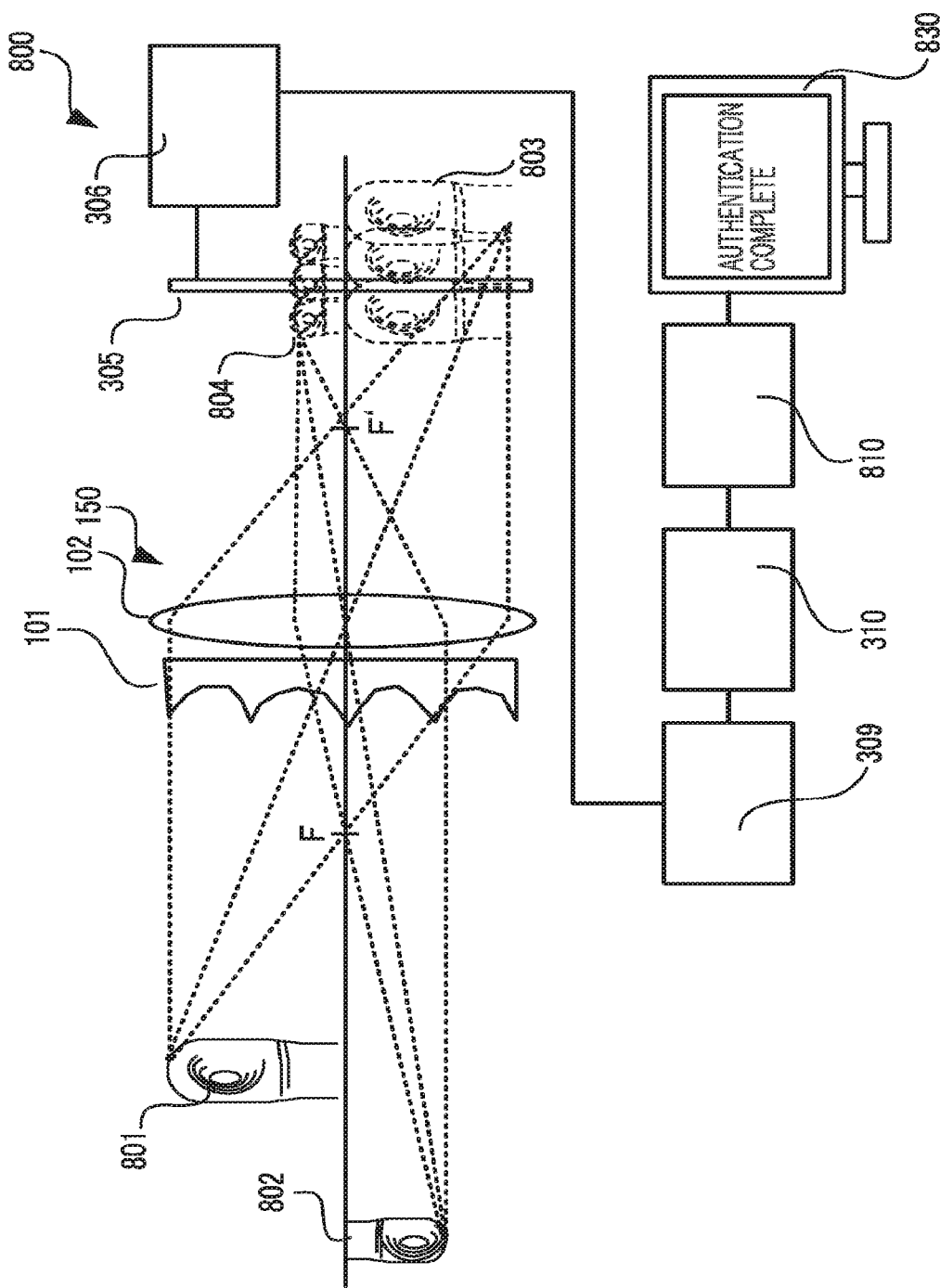
FIG. 29 is an exemplary configuration of an authentication apparatus of the fourth mode of the present invention.
Figure 30:
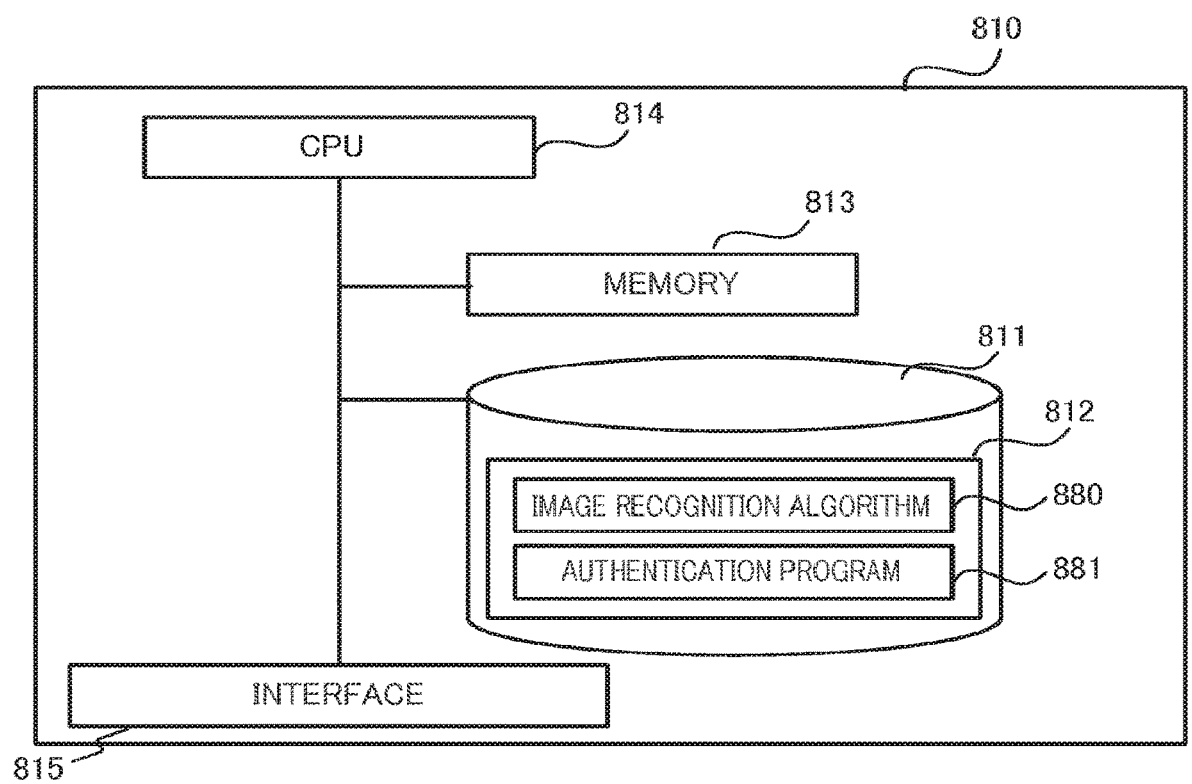
FIG. 30 is an exemplary configuration of hardware of an information processing apparatus provided to the authentication apparatus of the fourth mode of the present invention.

In addition to the above, an apparatus for capturing images of authentication targets with an imaging apparatus incorporating the phase filter 101 and performing predetermined authentication processing based on the captured images by the imaging apparatus, i.e., an authentication apparatus 800 may be realized. FIG. 29 is an exemplary configuration of the authentication apparatus of the fourth mode of the present invention. FIG. 30 is an exemplary configuration of hardware of an information processing apparatus provided to the authentication apparatus of the fourth mode of the present invention.

Similar to the imaging system 300 shown in the first mode of the present invention, the authentication apparatus 800 comprises an image sensor 305, an image signal output circuit 306, a deconvolution preprocess circuit 309, and a deconvolution filter circuit 310, and further includes an information processing apparatus 810. The processing results by the information processing apparatus 810 are to be displayed on the monitor display 830.

According to the configuration in this case, the lights reflected by the fingers 801, 802 as the authentication targets (for example, hands/fingers, palms, and wrists as targets of fingerprint authentication or vein authentication, pupils as targets of iris authentication, etc.) enter the image forming lens 102 via the phase filter 101 in the imaging optical system 150, and form images 803, 804 having uniform degree of blur in the direction of the optical axis 1. In the authentication apparatus 800, the image sensor 305 receives sensing data of the images 803, 804 and forwards the same to the image signal output circuit 306. The deconvolution preprocessing circuit 309 receives the image signal as the output of the image signal output circuit 306 and converts the image signal into the image signal of the digital image data type suitable to filtering calculation at the deconvolution filter circuit 310. The output signal from the deconvolution preprocessing circuit 309 are inputted to the information processing apparatus 810 after filtering processing at the deconvolution filter circuit 310. Then, the output signal is subject to the predetermined processing to realize at the monitor display 830 displaying images focused on the finger 801 when it is placed close and the finger 802 when it is placed distant, displaying and audio output of authentication processing results in accordance with the image displayed.

A hardware configuration of the information processing apparatus 810 provided to the above authentication apparatus 800 will be described below. The authentication apparatus 800 comprises a storage device 811 configured with appropriate non-volatile storage device such as a hard disk drive, a memory 813 configured with a volatile memory device such as RAM, a CPU 814 for reading a program 812 stored in the storage device 811 into a memory 813, executing the same, totally controlling the apparatus itself, and performing various decision, operation and control processes, 815 such as a display, a keyboard, and a mouse for receiving user inputs, outputting results, etc. It is to be noted that as the program 812, at least an image recognition algorithm 880 and an authentication program 881 for implementing functions required for the authentication apparatus 800. The processing with the program 812 will be described later.

Figure 31:
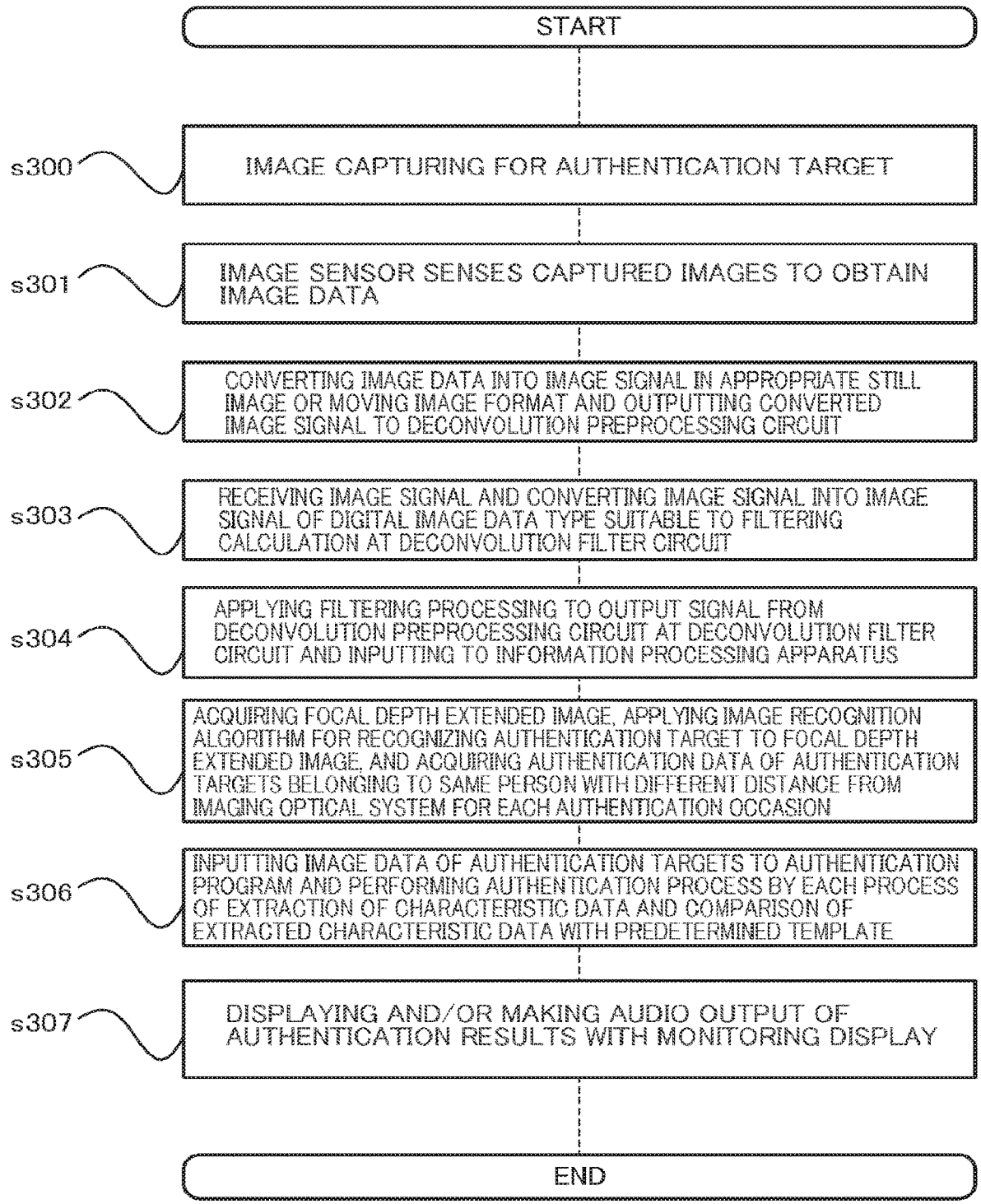
FIG. 31 is an exemplary processing flow carried out by the authentication apparatus of the fourth mode of the present invention.

Then, referring to FIG. 31, the processing flow carried out by the authentication apparatus 800 will be described. The imaging optical system 150 of the authentication apparatus 800 captures images of the authentication targets 801, 802 (s300), and the image sensor 305 senses the captured images 803, 804 to obtain the image data (s301).

The image sensor 305 provides the image signal output circuit 306 with the above image data as an image signal. The image signal output circuit 306 converts an output signal from the above image sensor 305 into an image signal in an appropriate still image or a moving image format while maintaining information of maximum resolution capable of outputting by the image sensor 305 and outputting the converted image signal to the deconvolution preprocessing circuit 309 (s302).

The deconvolution preprocessing circuit 309 receives the image signal as the output of the image signal output circuit 306 and converts the image signal into the image signal of the digital image data type suitable to filtering calculation at the deconvolution filter circuit 310 (s303). The output signal from the deconvolution preprocessing circuit 309 is subject to filtering processing at the deconvolution filter circuit 310 and inputted to the information processing apparatus 810 (s304).

The information processing apparatus 810 acquires output data from the deconvolution filter circuit 310, i.e., a focal depth extended image, applies the image recognition algorithm 770 for recognition of authentication targets to the local depth extended image, and detects a plurality of objects such as the authentication targets 801, 802 belonging to the same person with the different distances from the imaging optical system 150 (s305). The data for authentication will be image data corresponding to the images 803, 804 of fingerprints, veins, irises, etc. The image recognition algorithm 770 identifies the areas of shapes and/or sizes of the pixel groups of predetermined colors as predefined corresponding to the shapes of fingerprints, veins, irises, etc., for example, for the pixels constituting the original image and performs image processing such as highlighting of the identified areas.

The information processing apparatus 810 inputs the image data of the authentication targets 801, 802 obtained at step s305 to the authentication program 881 and performs ordinary authentication process by each process of extraction of the characteristic data by the authentication program 881 and compare the extracted characteristic data with the predetermined template, i.e., the reference data for authentication prepared beforehand for each person as an authentication target (s306).

The information processing apparatus 810 displays or outputs audibly the authentication results obtained at step s306 on the monitor display 830 (s307). According to the authentication apparatus 800 above, even in such a situation that a distance between the authentication objects such as a human fingerprint, vein, iris or the like and the imaging optical system changes for each authentication operation, such variation in the distance can be properly absorbed and improvement of authentication accuracy is enabled.

Figure 32:
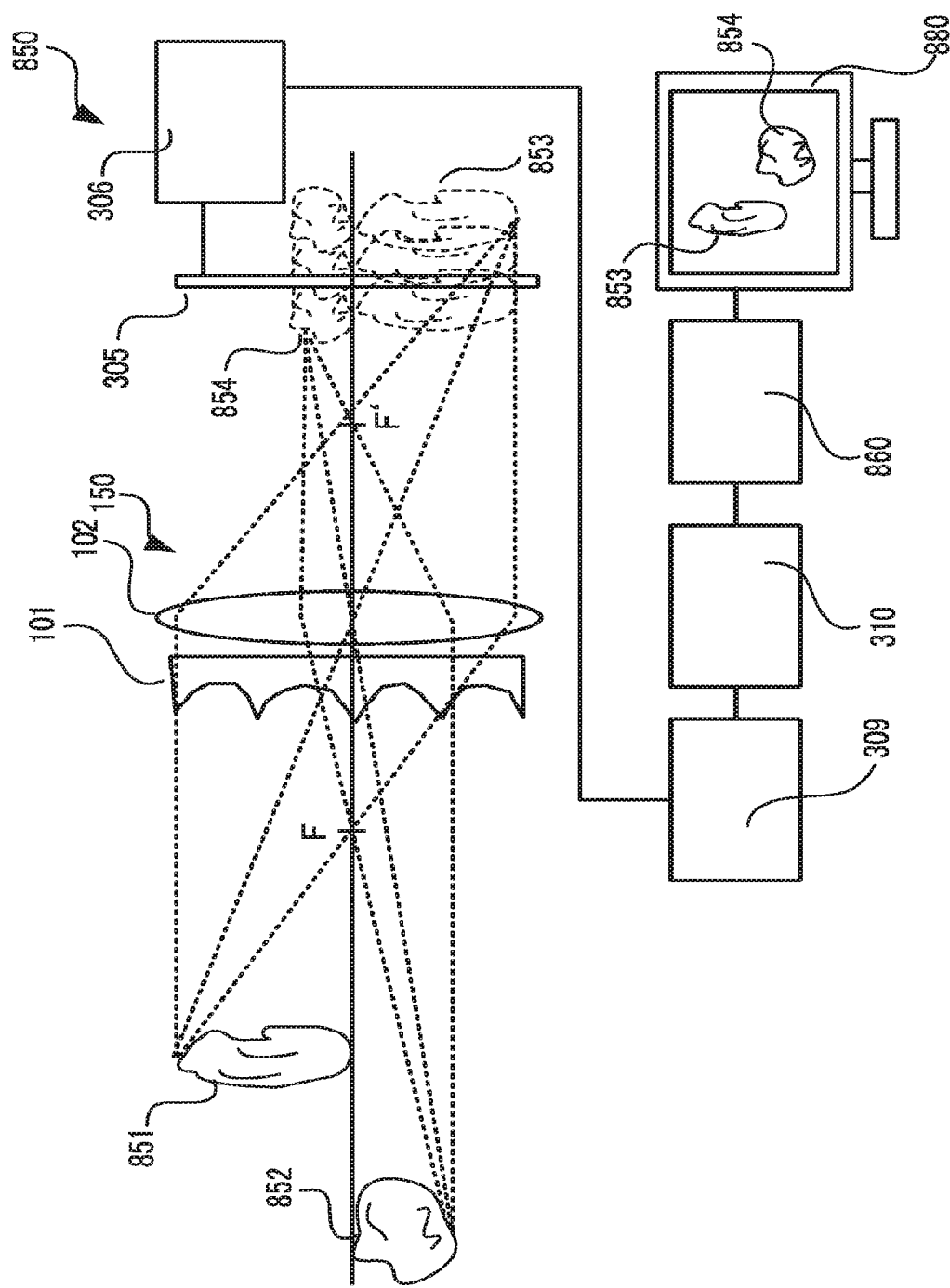
FIG. 32 is an exemplary configuration of a medical apparatus of the fifth mode of the present invention.
Figure 33:
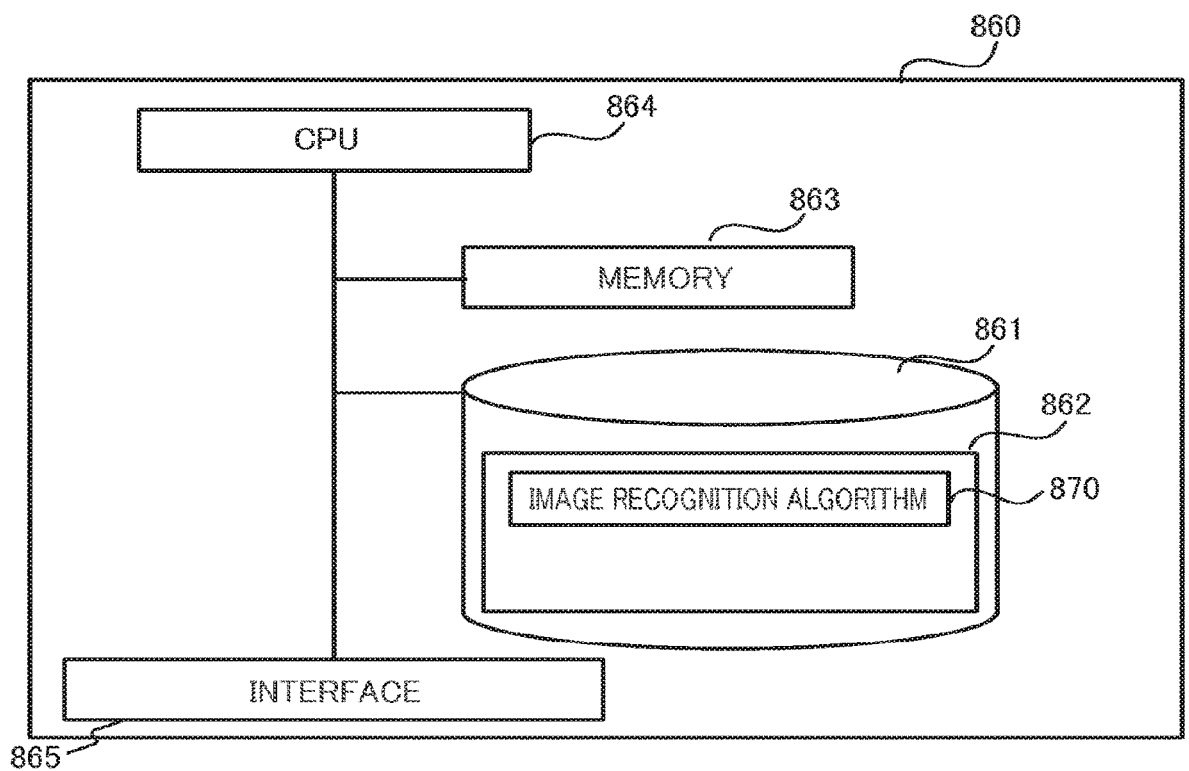
FIG. 33 is an exemplary configuration of hardware of an information processing apparatus provided to the medical apparatus of the fifth mode of the present invention.

In addition to the above, an apparatus for capturing images of predetermined medical care target area with an imaging apparatus of a medical apparatus incorporating the phase filter 101 and performing predetermined processing based on the captured images by the imaging apparatus, i.e., a medical apparatus 850 may be realized. FIG. 32 is an exemplary configuration of the medical apparatus of the fifth mode of the present invention. FIG. 33 is an exemplary configuration of hardware of an information processing apparatus 860 provided to the medical apparatus 850 of the fifth mode of the present invention.

Similar to the imaging system 300 shown in the first mode of the present invention, the medical apparatus 850 comprises an image sensor 305, an image signal output circuit 306, a deconvolution preprocess circuit 309, and a deconvolution filter circuit 310, and further includes an information processing apparatus 860. The processing results by the information processing apparatus 860 are to be displayed on the monitor display 880.

According to the configuration in this case, the lights reflected by the affected parts 851, 852 being the medical care target areas such as organs to be examined, treated, for example, enter the image forming lens 102 via the phase filter 101 in the imaging optical system 150, and form images 853, 854 having uniform degree of blur in the direction of the optical axis 1. In the medical apparatus 850, the image sensor 305 receives sensing data of the images 853, 854 and forwards the same to the image signal output circuit 306. The deconvolution preprocessing circuit 309 receives the image signal as the output of the image signal output circuit 306 and converts the image signal into the image signal of the digital image data type suitable to filtering calculation at the deconvolution filter circuit 310. The output signal from the deconvolution preprocessing circuit 309 are inputted to the information processing apparatus 860 after filtering processing at the deconvolution filter circuit 310. Then, the output signal is subject to the predetermined processing to realize at the monitor display 880 displaying images focused on the close affected part 851 and the distant affected part 852.

A hardware configuration of the information processing apparatus 860 provided to the above medical apparatus 850 will be described below. The information processing apparatus 860 comprises a storage device 861 configured with appropriate non-volatile storage device such as a hard disk drive, a memory 863 configured with a volatile memory device such as RAM, a CPU 864 for reading a program 862 stored in the storage device 861 into a memory 863, executing the same, totally controlling the apparatus itself, and performing various decision, operation and control processes, 865 such as a display, a keyboard, and a mouse for receiving user inputs, outputting results, etc. It is to be noted that as the program 862, at least an image recognition program 870 for implementing functions required for the medical apparatus 850. The processing with the program 862 will be described later.

Figure 34:
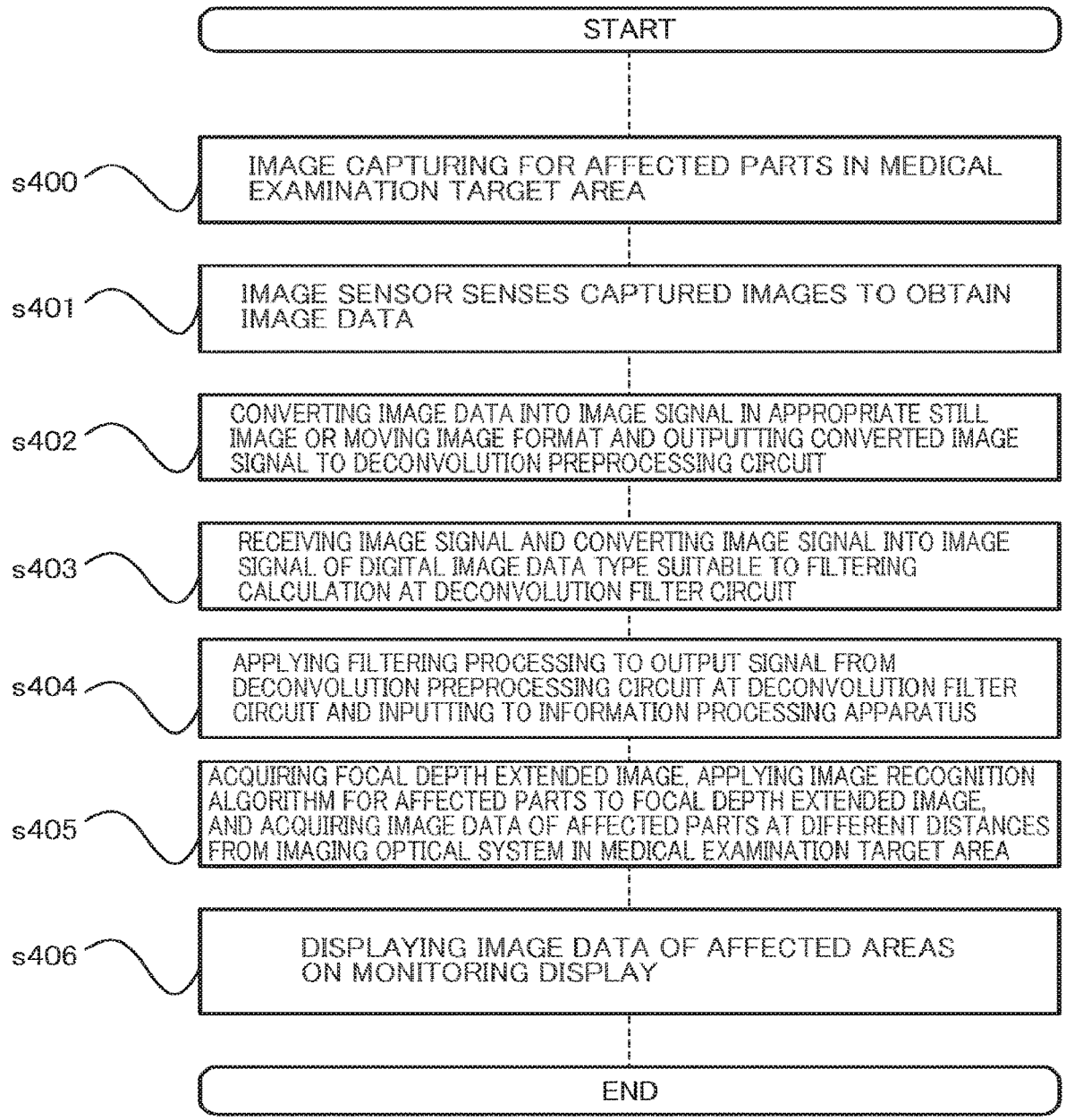
FIG. 34 is an exemplary processing flow carried out by the medical apparatus of the fifth mode of the present invention.

Then, referring to FIG. 34, the processing flow carried out by the medical apparatus 850 will be described. The imaging optical system 150 of the medical apparatus 850 captures images of the affected parts 851, 852 in the medical care target area (s400), and the image sensor 305 senses the captured images 853, 854 to obtain the image data (s401).

The image sensor 305 provides the image signal output circuit 306 with the above image data as an image signal. The image signal output circuit 306 converts an output signal from the above image sensor 305 into an image signal in an appropriate still image or a moving image format while maintaining information of maximum resolution capable of outputting by the image sensor 305 and outputting the converted image signal to the deconvolution preprocessing circuit 309 (s402).

The deconvolution preprocessing circuit 309 receives the image signal as the output of the image signal output circuit 306 and converts the image signal into the image signal of the digital image data type suitable to filtering calculation at the deconvolution filter circuit 310 (s403). The output signal from the deconvolution preprocessing circuit 309 is subject to filtering processing at the deconvolution filter circuit 310 and inputted to the information processing apparatus 860 (s404).

The information processing apparatus 860 acquires output data from the deconvolution filter circuit 310, i.e., a focal depth extended image, applies the image recognition algorithm 870 for recognition of affected parts to the focal depth extended image, and detects a plurality of objects such as the affected parts 851, 852 in the medical care target area at the different distances from the imaging optical system 150 in the medical care target area (s405). The image recognition algorithm 870 identifies the areas corresponding to shapes of the affected parts of shapes and/or sizes of the pixel groups of predetermined colors for example, for the pixels constituting the original image and performs image processing such as highlighting of the identified areas.

The information processing apparatus 860 displays the image data of the affected parts 851, 852, obtained at step s405 on the monitor display 880 (s406). According to the medical apparatus 850 above, simultaneous visibility by medical staff for affected parts without regard to a distance between each of the affected parts and the imaging optical system can be improved. This leads to simplification of optical system design in medical cameras and the like, reduction of the number of lenses required, etc. and to reduction in a manufacturing cost.

Although the best mode for carrying out the present invention and the like have been described specifically above, the present invention is not to be limitative thereto, but is able to be modified in various ways without departing from the gist thereof.

According to the modes of the present invention above, in focal depth extended images after image processing of WFC, in-plane position shift of image points in response to defocus is eliminated and the phase filter of the modes of the preset invention, the optical system employing the phase filter, and the imaging system can be applied to uses for measuring object positions by the positions of point images. Further, since the optical aspherical surface constituting the phase filter has a rotationally symmetrical shape and the mold to be used for forming the filter has a rotationally symmetrical shape, a revolving lathe working ca be used for manufacturing the mold. Therefore, reduction of time for manufacturing the mold for the phase filter and reduction of a manufacturing cost are made possible. Furthermore, since the annular structure is introduced to the phase filter, the concavo-convex shape of large magnitude is eliminated, that is, irregularity of the element is suppressed, variation in the phase shift amount for the ray of light having an angle of view ca be tolerated. Further, in the optical system of the modes of the present invention, the optical system equivalent to the configuration of axicon as annular zones can be realized and the optical system can be applied to imaging optical systems.

Accordingly, an in-plane position shift of an image point in response to defocusing can be suppressed in a focal depth extended image subject to image processing by WFC.

According to the description of the present specification, at least the following will be made clear. Namely, in the phase filter of the modes of the present invention, the annular zone may be configured to have a concave surface acting as a concave lens in a radial direction of a pupil plane for incident light flux. According to this, since the optical aspherical surface constituting the phase filter has a rotationally symmetrical shape in which annular concave surfaces are concentrically arranged and the mold to be used for forming the filter has a rotationally symmetrical shape, a revolving lathe working can be used for manufacturing the mold. Therefore, reduction of time for manufacturing the mold for the phase filter and reduction of a manufacturing cost are made possible. Further, since the annular structure is introduced to the phase filter, the concavo-convex shape of large magnitude is eliminated, that is, irregularity of the element is suppressed, variation in the phase shift amount for the ray of light having an angle of view can be tolerated.

Further, in the phase filter of the modes of the present invention, the annular structure may be configured to have the concave surface acting as a concave lens for incident light flux in a radial direction of a pupil plane and the convex surface acting as a convex lens alternatively. According to this, comparing with the annular structure configured only with the annular zones acting as a concave lens, the wavefront aberration of a pupil plane due to phase distribution, i.e., sharp peaks in the phase distribution is canceled and the phase distribution is made to have a smooth shape. Therefore, occurrence of chipping of the phase filter can be avoided.

Further, in the phase filter of the modes of the present invention, the width of each annular zone may be configured to be uniform among the annular zones. According to this, the annular structure of the phase filter can be made simple, and manufacturing time and manufacturing cost for the mold for forming the phase filter can be reduced.

Further, in the phase filter of the modes of the present invention, the phase difference made by the annular zone may be configured to be uniform for the annular zones. According to this, each of the annular zones of the phase filter is enabled to create the same phase shift for the annular zones.

Further, in the phase filter of the modes of the present invention, the width of each of the annular zones is configured to be made narrower from the optical axis toward the peripheral part of the phase filter. According to this, the area to which each of the annular zones contributes can be made uniform and vulnerability of the phase filter to variation in manufacturing can be tolerated.

Further, in the phase filter of the modes of the present invention, the phase difference made by the annular zone is configured to be made larger at the peripheral part of the phase filter than at the vicinity of the optical axis. According to this, contribution to focal depth extension by each of the annular zones of the phase filter can be smoothed regardless of the distance from the optical axis.

Any of FIGS. 1, 5, 23, 26, 29 and 32 shows the configuration that the phase plate having a flat surface at one side and a phase structure at the other side is inserted. However, since the same effect is achieved by directly forming the phase structure on the lens surface near the stop or the pupil plane at the position where the image is formed, the phase filter may be formed on such a lens directly and integrally.

As the lens optical system employing the present invention, not only the lens with a fixed focal length but also a zoom lens optical system with variable focal length may be assumed. If the phase filter is arranged near the stop or the pupil plane in the optical system, the present invention may be applied thereto basically, though the effect of focal depth extension may be more or less varied. Since the depth of field used for photographing is extended and the focus adjustment for the image and the sensor surface is made easy, the focus adjustment mechanism can be eliminated.

The invention claimed is:

1. An optical system used for an imaging camera comprising:
    an image forming optical system having a single focus position; and
    a phase filter including a plurality of annular zones disposed concentrically around a center of an optical axis of the phase filter,
    wherein each annular zone of the phase filter has a shape that locally diverges incident light flux refractionally,
    wherein a light flux parallel to the optical axis entering the image forming optical system enters each annular zones of the phase filter, and the respective light fluxes which pass through each annular zone of the phase filter pass through the single focus position of the image forming optical system, and
    wherein the annular zones cause the respective light fluxes to overlap in a range along the optical axis including the single focus position of the image forming optical system without focusing on the optical axis,
    wherein each of the annular zones of the phase filter includes a concave surface acting as a concave lens having a parabolic cross-section.

2. The optical system according to claim 1, wherein a width of each of the annular zones of the phase filter is configured to be uniform among the annular zones.

3. The optical system according to claim 1, wherein a width of each of the annular zones of the phase filter is made narrower in a direction from the optical axis toward a peripheral part of the phase filter.

4. The optical system according to claim 1, wherein a phase difference made by the annular zone is configured to be uniform for the annular zones.

5. The optical system according to claim 1, wherein a phase difference made by the annular zone is configured to be made larger at a peripheral part of the phase filter than at the vicinity of the optical axis.

6. The optical system according to claim 1, wherein a convex annular zone acting as a convex lens is provided between the annular zones each having a concave surface of the phase filter.

7. The optical system according to claim 1, wherein the phase filter is formed integrally and directly on a surface of a lens included in the image forming optical system.

8. An imaging optical system comprising:
    the image forming optical system according to claim 1,
    wherein the image forming optical system includes an image sensor disposed in a range where the light fluxes are caused to overlap along the optical axis.

9. An image processing system comprising:
    a deconvolution preprocessing circuit; and
    a deconvolution filter circuit coupled with said deconvolution preprocessing circuit,
    wherein said deconvolution preprocessing circuit and said deconvolution filter circuit are configured to apply a deconvolution image process to an image obtained by the image sensor according to claim 8 and to obtain a focal depth extending image by applying the deconvolution image process to the image obtained by the image sensor according to claim 8.

10. An optical system comprising:
    an image forming optical system having a single focus position; and
    a phase filter including a plurality of annular zones disposed concentrically around a center of an optical axis of the phase filter,
    wherein each said annular zone of the phase filter has a shape that locally diverges incident light flux refractionally,
    wherein a light flux parallel to the optical axis entering the image forming optical system enters each said annular zone of the phase filter, and the respective light fluxes which pass through each said annular zone of the phase filter are caused to be locally diverged refractionally, and
    wherein the respective light fluxes passing the respective annular zones of the phase filter and the image forming optical system are overlapped in a range along the optical axis at different angles without focusing on the optical axis,
    wherein each of the annular zones of the phase filter includes a concave surface acting as a concave lens having a parabolic cross-section.

11. The optical system according to claim 10, wherein the phase filter is formed integrally and directly on a surface of a lens included in the image forming optical system.

12. An imaging optical system comprising:
    the optical system according to claim 10; and
    an image sensor disposed in a range where the light fluxes are caused to overlap along the optical axis.

13. An imaging system comprising:
a deconvolution preprocessing circuit; and
a deconvolution filter circuit coupled with said deconvolution preprocessing circuit,
wherein said deconvolution preprocessing circuit and said deconvolution filter circuit are configured to apply a deconvolution image process to an image obtained by the image sensor according to claim 12 and to obtain a focal depth extending image by applying the deconvolution image process to the image obtained by the image sensor according to claim 12.

* * * * *